(12) United States Patent
Oyakawa

(10) Patent No.: US 10,074,044 B2
(45) Date of Patent: Sep. 11, 2018

(54) PRINTING DEVICE, PRINTING METHOD, AND RECORDING MEDIUM

(71) Applicant: CASIO COMPUTER CO., LTD., Tokyo (JP)

(72) Inventor: Yasushi Oyakawa, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/071,313

(22) Filed: Mar. 16, 2016

(65) Prior Publication Data

US 2016/0283830 A1 Sep. 29, 2016

(30) Foreign Application Priority Data

Mar. 23, 2015 (JP) .................. 2015-058928

(51) Int. Cl.
| | | |
|---|---|---|
| *G06F 15/00* | (2006.01) | |
| *G06K 15/02* | (2006.01) | |
| *B41J 3/407* | (2006.01) | |

(52) U.S. Cl.
CPC ........ *G06K 15/1825* (2013.01); *B41J 3/4075* (2013.01); *G06K 15/022* (2013.01); *G06K 15/1802* (2013.01); *G06K 15/1807* (2013.01); *G06K 15/1896* (2013.01)

(58) Field of Classification Search
USPC ....................................... 358/1.18
See application file for complete search history.

(56) References Cited

U.S. PATENT DOCUMENTS

| | | | | |
|---|---|---|---|---|
| 6,045,277 | A  * | 4/2000 | Kurashina | ............ B41J 3/4075 400/61 |
| 2011/0279839 | A1* | 11/2011 | Walsh | ................. G06F 3/1208 358/1.11 |
| 2013/0107317 | A1* | 5/2013 | Yamauchi | ............ B41J 13/106 358/1.15 |

FOREIGN PATENT DOCUMENTS

| | | |
|---|---|---|
| JP | H03-031147 B2 | 5/1991 |
| JP | 2006-051798 A | 2/2006 |
| JP | 3884604 B2 | 2/2007 |
| JP | 2009-116438 A | 5/2009 |
| JP | 2009-220544 A | 10/2009 |
| JP | 2012-116109 A | 6/2012 |
| JP | 2013-067042 A | 4/2013 |

* cited by examiner

*Primary Examiner* — Saeid Ebrahimi Dehkord
(74) *Attorney, Agent, or Firm* — Scully, Scott, Murphy & Presser, P.C.

(57) ABSTRACT

A printing device printing on a non-transitory recording medium with a print head, comprising the following:
 an input receiver receiving input of a character string including multiple characters;
 a print data transmitter sending to the print head individually inverted characters of one or more characters included in the character string of which the input is received; and
 a printer printing with the print head the inverted characters received by the print head such that the inverted characters are arranged closer to a leading end in a transfer direction of the recording medium.

24 Claims, 19 Drawing Sheets

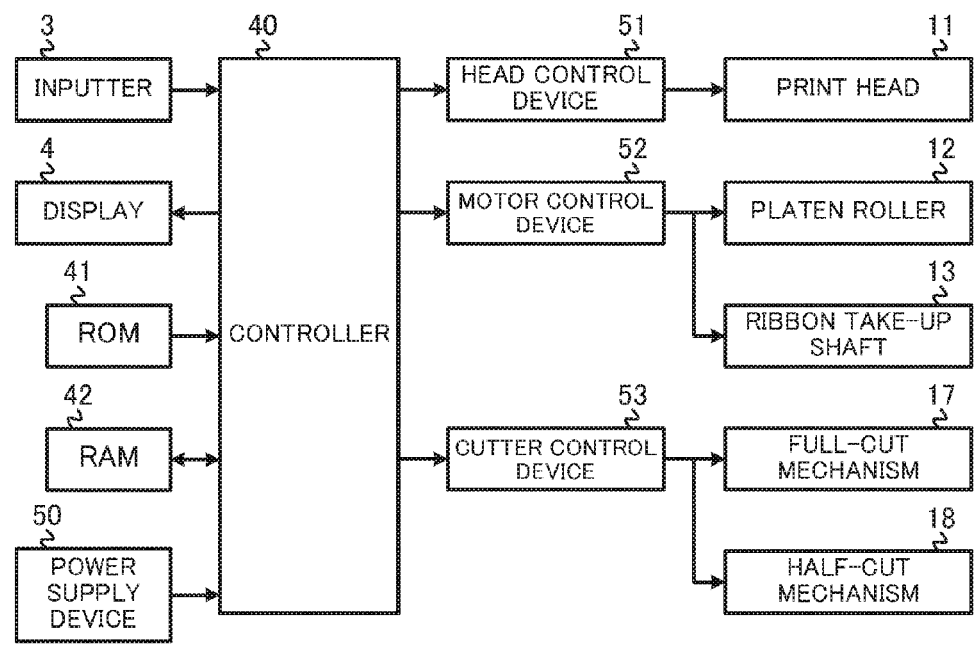
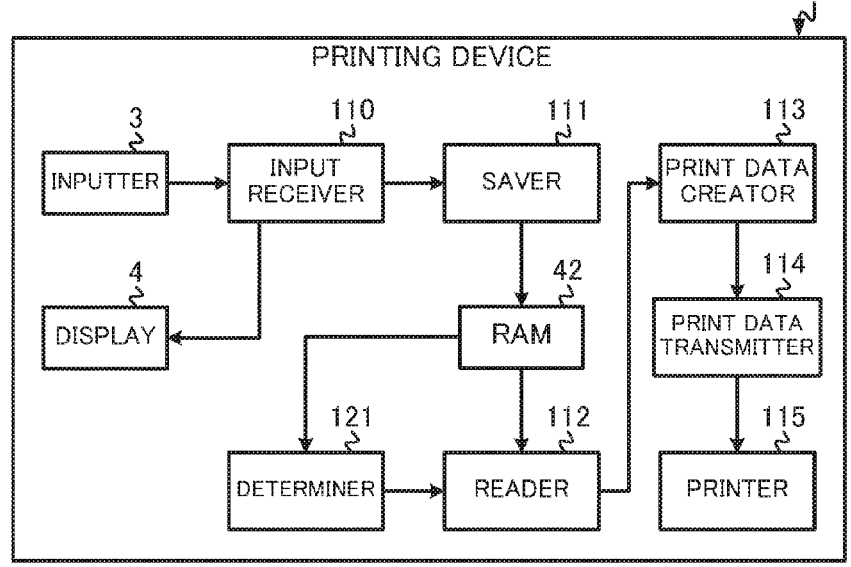

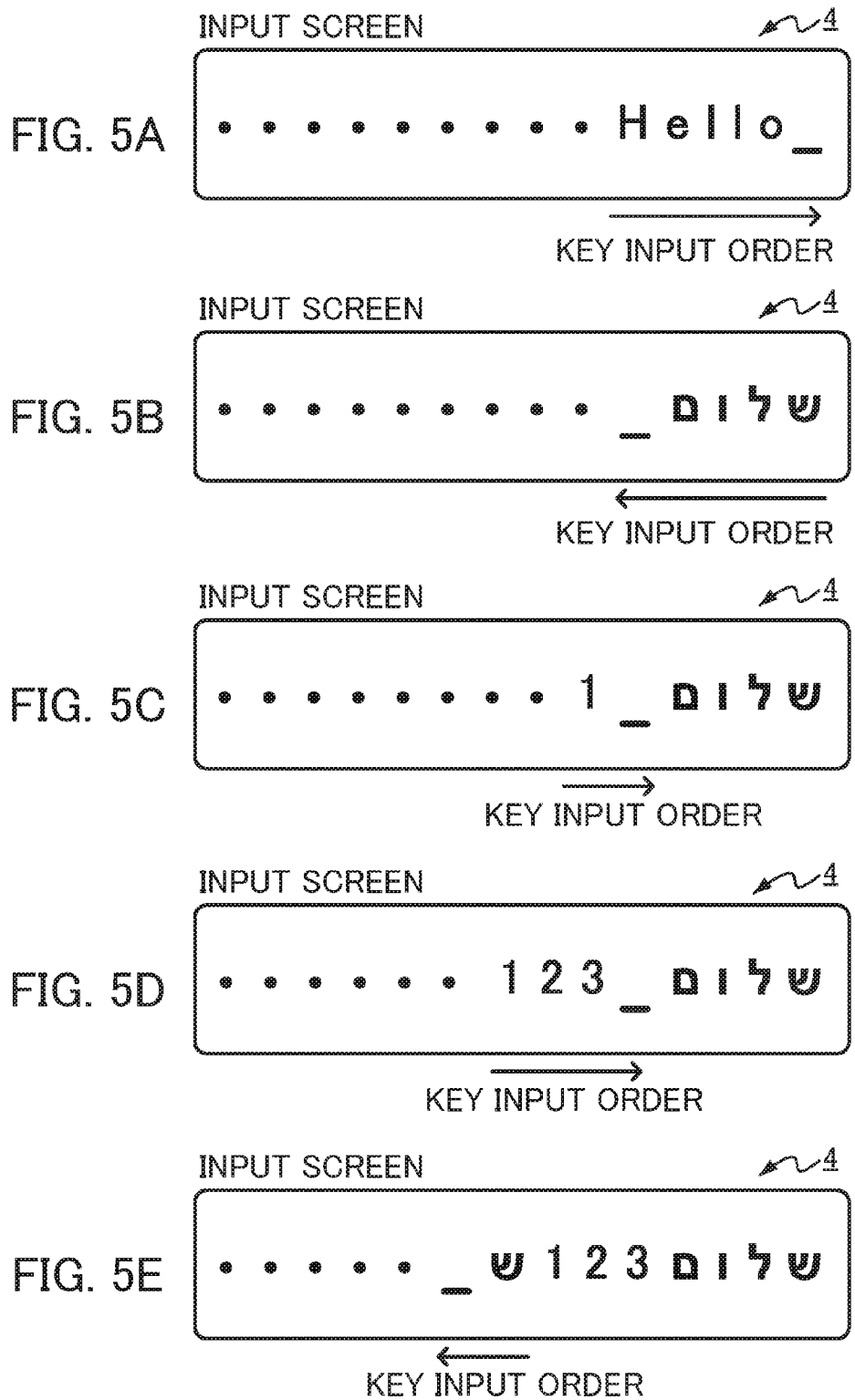

FIG. 6A  KEY INPUT ORDER →
Hello ↓ World ↓ 1 2 3

FIG. 6B  ORDER OF SAVING IN MEMORY →
3 2 1 ↓ d l r o W ↓ o l l e H

FIG. 6C  ORDER OF READING FROM MEMORY →
Hello ↓ World ↓ 1 2 3

FIG. 6D  PRINT DATA                    81
Hello  World  123

FIG. 6E  TRANSMISSION ORDER  HEAD SCAN DIRECTION →   81
Hello  World  123

FIG. 6F  PRINT RESULT                   31
Hello  World  123
← TRANSFER DIRECTION

FIG. 8A

INFORMATION IN MEMORY

| ENTERED CHARACTER | ADDRESS | CHARACTER CODE (unicode) |
|---|---|---|
| 3 | 0 | 0x0033 |
| 2 | 1 | 0x0032 |
| 1 | 2 | 0x0031 |
| ↓ | 3 | (LINE BREAK CODE) |
| d | 4 | 0x0064 |
| l | 5 | 0x006C |
| r | 6 | 0x0072 |
| ⋮ | ⋮ | ⋮ |

FIG. 8B

INFORMATION IN MEMORY

| ENTERED CHARACTER | ADDRESS | CHARACTER CODE (unicode) |
|---|---|---|
| ש | 0 | 0x05E9 |
| ל | 1 | 0x05DC |
| ו | 2 | 0x05D5 |
| ם | 3 | 0x05DD |
| ↓ | 4 | (LINE BREAK CODE) |
| ה | 5 | 0x05D4 |
| ⋮ | ⋮ | ⋮ |

FIG. 9

PRINT RESULT ⁓31

Hello World
123

FIG. 15A  KEY INPUT ORDER →
Hello ↓ World ↓ 1 2 3

FIG. 15B  ORDER OF SAVING IN MEMORY →
Hello ↓ World ↓ 1 2 3

FIG. 15C  ORDER OF READING FROM MEMORY →
Hello ↓ World ↓ 1 2 3

FIG. 15D  PRINT DATA                    83
Hello  World  123

FIG. 15E  TRANSMISSION ORDER  HEAD SCAN DIRECTION →   83
Hello  World  123

FIG. 15F  PRINT RESULT                  31
Hello  World  123
← TRANSFER DIRECTION FIG. 19A KEY INPUT ORDER → Hello ↓ World ↓ 123

FIG. 19B ORDER OF SAVING IN MEMORY → Hello ↓ World ↓ 123

FIG. 19C ORDER OF READING FROM MEMORY → 321 ↓ dlrow ↓ olleH

FIG. 19D PRINT DATA ~84

FIG. 19E HEAD SCAN DIRECTION → TRANSMISSION ORDER ~84

FIG. 19F PRINT RESULT ~31 ← TRANSFER DIRECTION

FIG. 23A  KEY INPUT ORDER →  ש ו ל ו ם ↓ ה ע ו ל ם ↓ 1 2 3

FIG. 23B  ORDER OF SAVING IN MEMORY →  ש ו ל ו ם ↓ ה ע ו ל ם ↓ 3 2 1

FIG. 23C  ORDER OF READING FROM MEMORY →  ש ו ל ו ם ↓ ה ע ו ל ם ↓ 3 2 1

FIG. 23D  PRINT DATA ~86

FIG. 23E  HEAD SCAN DIRECTION →  TRANSMISSION ORDER ↓  ~86

FIG. 23F  PRINT RESULT ~31  ← TRANSFER DIRECTION

PRINTING DEVICE, PRINTING METHOD, AND RECORDING MEDIUM

CROSS-REFERENCE TO RELATED APPLICATION

This application claims the benefit of Japanese Patent Application No. 2015-058928, filed on Mar. 23, 2015, the entire disclosure of which is incorporated by reference herein.

FIELD

This application relates generally to a printing device, printing method, and recording medium.

BACKGROUND

Among languages currently used across the world, some are written from left to right and some are written from right to left. For example, character strings are written and read from left to right in the Japanese language when written horizontally and in Western languages including English. On the other hand, character strings are written and read from right to left in Hebrew, Arabic, and the like.

Printing devices use different systems and formats depending on the above difference in the direction of writing character strings. Therefore, many printing devices are generally specialized either for languages written from left to right or for languages written from right to left. On the other hand, printing devices capable of dealing with multiple languages different in the direction of writing character strings have been developed.

As an printing device capable of dealing with multiple languages different in the direction of writing character strings, for example, Unexamined Japanese Patent Application Kokai Publication No. 2012-116109 discloses a printing device printing character strings of multiple languages different in the direction of writing character strings at a time to make prints. More specifically, the printing device disclosed in the above literature scroll-displays character information in a given direction according to the reading direction of the language.

For printing a character string on a recording medium such as a label and tape, a printing device prints the character string on the recording medium in left alignment, namely at a position with reference to the left end of the recording medium in one way and prints the character string on the recording medium in right alignment, namely at a position with reference to the right end of the recording medium in the other way. For example, for printing a character string of a language written horizontally from left to right such as Japanese and English, the first character is positioned on the left and therefore the character string is printed in left alignment in many cases. On the other hand, for printing a character string of a language written horizontally from right to left such as Hebrew and Arabic, the first character is positioned on the right and therefore the character string is printed in right alignment in many cases. Thus, many printing devices for the languages like Japanese and English comprise a printing mechanism specialized for the left-to-right horizontal writing system and many printing devices for the languages like Hebrew and Arabic comprise a printing mechanism specialized for the right-to-left horizontal writing system. In this specification, a printing mechanism specialized for the left-to-right horizontal writing system means a printing mechanism printing character strings in the manner that you see the top-to-bottom direction of characters printed on a recording medium run from left to right under the default print settings provided that the recording medium is placed with the leading end in the transfer direction facing toward you and the printing surface facing upward. On the other hand, a printing mechanism specialized for the right-to-left horizontal writing system means a printing mechanism printing character strings in the manner that you see the top-to-bottom direction of characters printed on a recording medium run from right to left under the default print settings provided that the recording medium is placed with the leading end in the transfer direction facing toward you and the printing surface facing upward. Both with a left-to-right horizontal writing printing mechanism and with a right-to-left horizontal wiring printing mechanism, the first character to print is printed closer to the leading end in the transfer direction of the recording medium under ordinary print settings providing no margin before the printed characters. However, a large difference between a left-to-right horizontal writing printing mechanism and a right-to-left horizontal writing printing mechanism is that the characters printed under such default print settings result in print in left alignment with a left-to-right horizontal writing printing mechanism and result in print in right alignment with a right-to-left horizontal writing printing mechanism.

On the other hand, in some cases, a character string may be printed in right alignment with a left-to-right horizontal writing printing mechanism or printed in left alignment with a right-to-left horizontal writing printing mechanism. In other words, with each printing mechanism, a character string may be printed closer to the opposite end to the reference end under the default print settings (the right end of a recording medium in the case of a left-to-right horizontal writing printing mechanism and the left end of a recording medium in the case of a right-to-left horizontal writing printing mechanism). In such a case, the character string has to be positioned closer to the tail end in the transfer direction of the recording medium. Therefore, traditionally, it is necessary to pre-calculate the length of a printed character string and the difference between the length of a label to create or the like and the length of the character string based on print settings and advance the unprinted recording medium by the length of a preceding margin based on the difference immediately before the printing. As just described, the print start position (the margin from the leading end) has to be adjusted with reference to the leading end of the recording medium, whereby the processing becomes complex and it is difficult to obtain a print result in which the character string is properly positioned. Consequently, it was difficult to realize proper printing in left alignment and printing in right alignment with a single platform.

SUMMARY

The printing device according to the present disclosure is a printing device printing on a non-transitory recording medium with a print head, comprising the following:

an input receiver receiving input of a character string including multiple characters;

a print data transmitter sending to the print head individually inverted characters of one or more characters included in the character string of which the input is received; and a printer printing with the print head the inverted characters received by the print head such that the inverted characters are arranged closer to a leading end in a transfer direction of the recording medium.

The printing method according to the present disclosure is a printing method executed by a controller of a printing device printing on a non-transitory recording medium with a print head, comprising the following:

receiving input of a character string;

sending to the print head individually inverted characters of one or more characters included in the character string of which the input is received; and printing with the print head the inverted characters received by the print head such that the inverted characters are arranged closer to a leading end in a transfer direction of the recording medium.

The recording medium according to the present disclosure is a non-transitory nonvolatile computer-readable recording medium on which programs for making a computer controlling a printing device printing on a non-transitory recording medium with a print head function as follows are stored:

receiving input of a character string;

sending to the print head individually inverted characters of one or more characters included in the character string of which the input is received; and printing with the print head the inverted characters received by the print head such that the inverted characters are arranged closer to a leading end in a transfer direction of the recording medium.

BRIEF DESCRIPTION OF THE DRAWINGS

A more complete understanding of this application can be obtained when the following detailed description is considered in conjunction with the following drawings, in which:

FIG. 3 is a block diagram showing the physical configuration of the printing device according to an embodiment of the present disclosure;

FIG. 4 is a block diagram showing the functional configuration of the printing device according to Embodiment 1;

FIGS. 5A to 5E are illustrations showing exemplary input screens when input of a character string is received;

FIGS. 6A to 6F are illustrations showing the character string processing when a character string of the left-to-right horizontal writing system is entered in the printing device comprising a left-to-right horizontal writing printing mechanism according to Embodiment 1;

FIGS. 8A and 8B are illustrations showing exemplary information in the memory;

FIG. 9 is an illustration showing an exemplary print in which multiple blocks of character strings are arranged in the width direction of the tape material;

FIGS. 15A to 15F are illustrations showing the character string processing when an input mode not accepting input of characters of the right-to-left horizontal writing system is specified in the printing device comprising a left-to-right horizontal writing printing mechanism according to Embodiment 2;

FIGS. 19A to 19F are illustrations showing the character string processing for printing a character string of the left-to-right horizontal writing system in right alignment in the printing device comprising a left-to-right horizontal writing printing mechanism according to Embodiment 3;

FIGS. 23A to 23F are illustrations showing the character string processing when a character string including characters of the right-to-left horizontal writing system is entered in the printing device comprising a left-to-right horizontal writing printing mechanism according to a modified embodiment.

DETAILED DESCRIPTION

Figure 1:
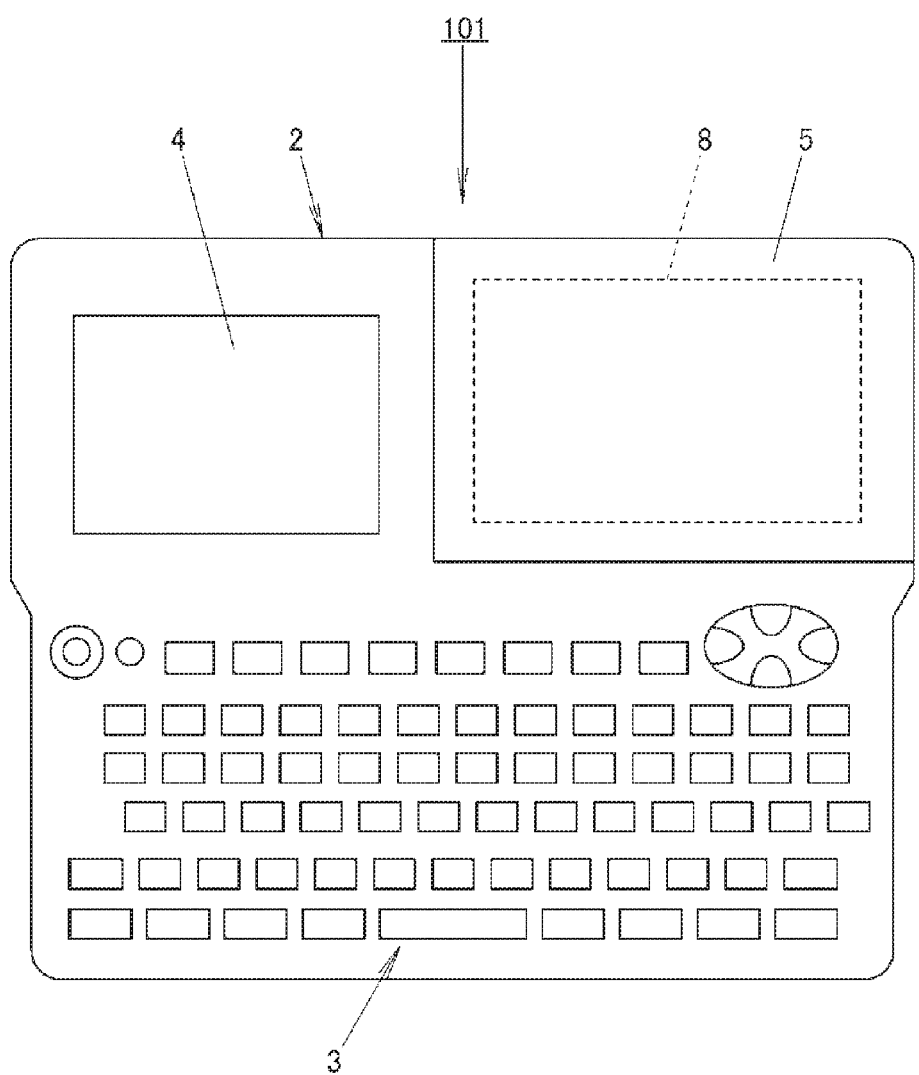
FIG. 1 is a plane view of the printing device according to an embodiment of the present disclosure.

Embodiments of the present disclosure will be described hereafter with reference to the drawings. Here, in the drawings, the same or corresponding components are referred to by the same reference numbers.

Embodiment 1

FIG. 1 shows a plane view of the printing device according to Embodiment 1 of the present disclosure. A printing device 101 is a device printing print data including graphic and/or character patterns on a recording medium that is a tape material formed by laminating a printing tape having a printing surface on the front and an adhesive surface on the back and a releasable tape attached to the adhesive surface while transferring the recording medium in a predetermined direction.

The printing device 101 comprises, on the top surface of an enclosure 2, an inputter 3, a display 4, and an opening/closing lid 5 closing a tape housing 8. Moreover, although not shown, the enclosure 2 comprises input terminals for making connection to an external device such as a personal computer, power supply terminals to which a power code is connected, an insert slot into which a storing medium such as a memory card is inserted, and the like.

The inputter 3 comprises character input keys for entering character data, a print key for ordering print start, a cursor key for moving a cursor on the display screen of the display 4, and various control keys for setting a print mode and conducting various setting operations. The user can enter a character string to print on the tape material by operating the character input keys of the inputter 3.

The display 4 comprises a display screen such as a liquid crystal display panel as the main panel of the printing device 101. The display 4 displays images regarding entered data, a selection menu for various settings, messages regarding various operations, and the like. For example, the display 4 displays a character string entered via the inputter 3 to print on the tape material.

Figure 2A:
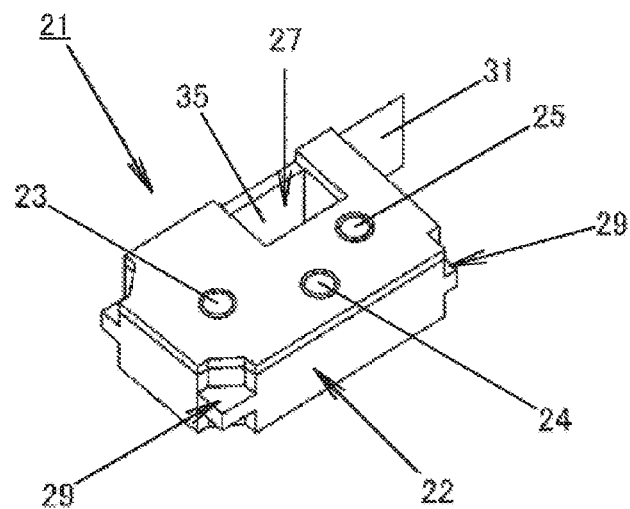
FIG. 2A is a perspective external view of the tape cassette.
Figure 2B:
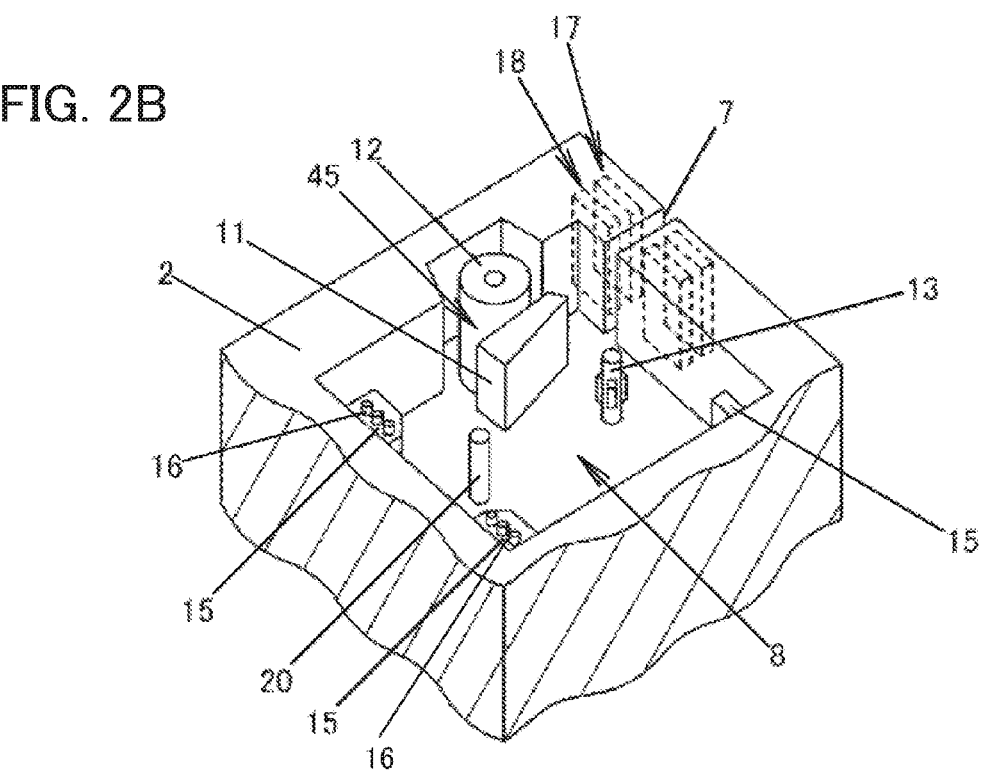
FIG. 2B is an enlarged internal view of the printing device according to an embodiment of the present disclosure.

FIG. 2B shows a perspective view of a part of the internal structure of the printing device 101. The tape housing 8 for housing (loading) a tape cassette 21 containing a tape material 31 and an ink ribbon 35 is formed inside the opening/closing lid 5. A tape printing mechanism 45 as a printer and cassette receivers 15 for supporting the tape cassette 21 at a given position are formed inside the tape housing 8.

The tape printing mechanism 45 comprises printing elements arranged in the vertical direction, a print head (thermal head) 11, a platen roller 12 clamping and transferring the tape material 31 and ink ribbon 35 together with the print head 11, a positioning shaft 20 engaging with and positioning the tape cassette 21, and a ribbon take-up shaft 13 taking up the ink ribbon 35 used for printing into the tape cassette 21.

Moreover, a tape dispenser 7 leading to the outside of the enclosure 2 is formed at one end of the tape housing 8. A full-cut mechanism 17 as full-cut means for cutting the printing tape and releasable tape of the tape material 31 crosswise and a half-cut mechanism 18 as half-cut means for cutting only the printing tape of the tape material 31 and leaving the releasable tape uncut are installed in the tape dispenser 7.

FIG. 2A shows the appearance of the tape cassette 21 used in the printing device 101. The tape cassette 21 comprises a cassette casing 22. A tape core 23 around which the tape material 31 is wound, a ribbon feed core 24 around which an unused ink ribbon 35 is wound, and a ribbon take-up core 25 taking up the used ink ribbon 35 are each housed in the cassette casing 22. Moreover, a head positioner 27 in which the print head 11 is positioned when the tape cassette 21 is loaded in the tape housing 8 is formed in the cassette casing 22 of the tape cassette 21.

Engagees 29 engaging with the cassette receivers 15 of the tape housing 8 and supported by the cassette receivers 15 are formed at the corners of the cassette casing 22. Then, not-shown given uneven surfaces are formed on the engagees 29 of the cassette casing 22 in accordance with the type of the tape cassette 21, and given tape width detection switches 16 determining the uneven surfaces formed on the engagees 29 of the cassette casing 22 when the tape cassette 21 is loaded are formed on the cassette receivers 15 of the tape housing 8.

In the printing device 101, as the cassette casing 22 is loaded in the tape housing 8, some or all of the engagees 29 of the cassette casing 22 and the tape width detection switches 16 formed on the cassette receivers 15 of the tape housing 8 engage and the engaged tape width detection switches 16 are pressed down. The printing device 101 determines the type of the tape cassette 21 such as the tape width according to the combination of the tape width detection switches turned on.

In other words, since the type of the tape cassette 21 varies depending on the width and the like of the contained tape material 31, the printing device 101 determines the type of the tape cassette 21 to identify the width, color, and the like of the tape that is the printing target, and creates print data suitable for the tape width.

As the printing is ordered, the tape material 31 and ink ribbon 35 are dispensed from the tape cassette 21. The tape material 31 and ink ribbon 35 are clamped and transferred between the platen roller 12 and print head 11 in the laminated state.

Then, the print head 11 is thermally activated based on the print data so that the ink of the ink ribbon 35 is heat-transferred to the printing tape of the tape material 31 for printing. As the printing ends, the full-cut mechanism 17 or half-cut mechanism 18 is activated according to the setting to cut the tape material 31 crosswise and create a piece of tape-like label.

FIG. 3 shows the physical configuration of the printing device 101. The printing device 101 comprises a controller 40, an inputter 3, a display 4, a read only memory (ROM) 41, a random access memory (RAM) 42, a power supply device 50, a head control device 51, a motor control device 52, and a cutter control device 53.

The controller 40 comprises, for example, a central processing unit (CPU) or a dedicated control circuit such as an application specific integrated circuit (ASIC). The controller 40 starts up a system program presorted in the ROM 41, a control program stored in a memory card, a control program read from an external device, or the like according to a key operation signal from the inputter 3 or automatically, and controls the operations of the circuit elements using the RAM 42 as the work memory.

The ROM 41 stores programs for printing characters entered from the inputter 3, data and size information for characters, symbols, graphics, and the like, print fonts, and the like. The ROM 41 also functions as a storing medium storing programs and data for the controller 40 to read for various operations.

The RAM 42 comprises regions such as an input data memory storing key-input printing information such as characters, size, and character spacing, a print data memory storing print pattern data presenting developed entered printing information, and a display data memory storing pattern data to display on the display 4. The RAM 42 comprises registers temporarily storing data necessary for the printing procedure and the like, counters, and the like. Moreover, the RAM 42 functions as a memory saving a character string entered via the inputter 3 to print on the tape material 31 (an internal memory).

The head control device 51 controls the print head 11 based on the print pattern data and executes printing on the tape material 31 that is a recording medium. Comprising a circuit for driving transfer means, the motor control device 52 controls a step motor rotating the platen roller 12 and ribbon take-up shaft 13 to transfer the tape material 31 in the longitudinal direction at a specified speed. Comprising a circuit for controlling a motor driving the full-cut mechanism 17 and half-cut mechanism 18, the cutter control device 53 controls the full-cut mechanism 17 and half-cut mechanism 18.

Here, various kinds of printing mechanisms provided to the above-described printing device 101 are printing mechanisms specialized for the left-to-right horizontal writing system. Here, a printing mechanism specialized for the left-to-right horizontal writing system is a printing mechanism for printing a character string in the manner that you see the top-to-bottom direction of characters printed on the tape material 31 run from left to right provide that the tape material 31 is placed with the leading end in the transfer direction facing toward you and the printing surface facing upward. On the other hand, a printing mechanism specialized for the right-to-left horizontal writing system is a printing mechanism for printing a character string in the manner that you see the top-to-bottom direction of characters printed on the tape material 31 run from right to left provided that the tape material 31 is placed with the leading end in the transfer direction facing toward you and the printing surface facing upward. For easier understanding, the following explanation will be made on the assumption that the printing device 101 comprises a printing mechanism specialized for the left-to-right horizontal writing system.

FIG. 4 shows the functional configuration of the printing device 101. The printing device 101 comprises an input receiver 110, a saver 111, a reader 112, a print data creator 113, a print data transmitter 114, a printer 115, and a determiner 121. The controller 40 reads programs stored in the ROM 41 into the RAM 42 and executes the read programs to function as the above components.

The input receiver 110 functions as input reception means for receiving input of a character string including one or more characters. More specifically, the input receiver 110 receives input of a character string to print on the tape material 31. The input receiver 110 can receive a character string of a first writing system in which writing proceeds from left to right such as Japanese, English, and numbers ("the left-to-right horizontal writing system" hereafter) and can receive a character string of a second writing system in which writing proceeds from right to left such as Hebrew and Arabic ("the right-to-left horizontal writing system" hereafter).

The character string of which input is received by the input receiver 110 is displayed on the display 4 as an input screen. FIGS. 5A to 5E specifically show exemplary input screens displayed on the display 4.

For example, FIG. 5A shows an input screen when the input receiver 110 receives input of an English character string "Hello" as a character string of the left-to-right horizontal writing system. In such a case, each time input of one character is received, the cursor indicating the input position shifts to the right of the entered character. Therefore, five characters included in the entered character string "Hello" are arranged and displayed on the input screen from left to right in the order of receiving the key-input, namely from the first character "H." On the other hand, FIG. 5B shows an input screen when the input receiver 110 receives input of a Hebrew character string as a character string of the right-to-left horizontal writing system. In such a case, each time input of one character is received, the cursor shifts to the left of the entered character. Therefore, four characters included in the entered Hebrew character string are arranged and displayed on the input screen from right to left in the order of receiving the key-input, namely from the first character.

Moreover, the input receiver 110 can receive input of a character string in which character strings of the right-to-left horizontal writing system and character strings of the left-to-right horizontal writing system are mixed as character strings of the right-to-left horizontal writing system such as Hebrew can actually be mixed in writing with character strings of the left-to-right horizontal writing system such as numbers and alphabets. For example, FIGS. 5C and 5D show input screens when the input receiver 110 receives input of a Hebrew character string of the right-to-left horizontal writing system and then input of a character string of the left-to-right horizontal writing system (more specifically, input of a number "123"). While input of a number "123" is received, the cursor shifts to the right of the entered character each time input of one character is received. Therefore, five characters included in the entered character string "Hello" are arranged and displayed on the input screen from left to right in the order of receiving the key-input, namely from the first character "H." Moreover, if the input receiver 110 further receives a Hebrew character string of the right-to-left horizontal writing system after input of the number "123" of the left-to-right horizontal writing system is received, the cursor shifts to the left of the entered character as shown in FIG. 5E. Therefore, it is possible to enter a character string of the right-to-left horizontal writing system again.

Returning to FIG. 4, the saver 111 functions as saving means for saving in the RAM 42 one or more characters included in a character string of which input is received by the input receiver 110. In more detail, when input of characters of the left-to-right horizontal writing system is received by the input receiver 110, the saver 111 saves in the RAM 42 the characters of the left-to-right horizontal writing system in the reverse order to the order of receiving the input. On the other hand, when input of characters of the right-to-left horizontal writing system is received by the input receiver 110, the saver 111 saves in the RAM 42 the characters of the right-to-left horizontal writing system in the order of receiving the input.

For example as shown in FIG. 6A, when input of a character string "Hello↓World↓123," which is entirely of the left-to-right horizontal writing system, is received, the saver 111 saves in the RAM 42 one or more characters included in the entered character string of the left-to-right horizontal writing system in the order "321↓dlroW↓olleH" as shown in FIG. 6B. More specifically, as shown in FIG. 8A, the saver 111 saves a character code assigned to the character "3" at an address "0" of the RAM 42, saves a character code assigned to the character "2" at an address "1" of the RAM 42, and so on so as to save the character codes that are information presenting the characters in sequence from the address "0" of the RAM 42.

Figure 7A:
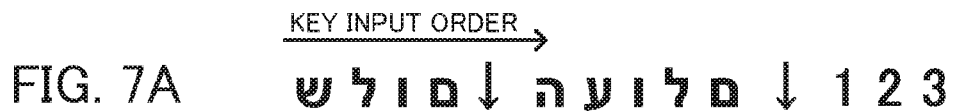
FIGS. 7A to 7F are illustrations showing the character string processing when a character string including characters of the right-to-left horizontal writing system is entered in Embodiment 1.
Figure 7B:

On the other hand, when input of a Hebrew character string including characters of the right-to-left horizontal writing system is received as shown in FIG. 7A, the saver 111 saves in the RAM 42 one or more characters included in the input-received character string including characters of the right-to-left horizontal writing system in the order as shown in FIG. 7B. More specifically, as shown in FIG. 8B, the saver 111 saves a character code assigned to the first Hebrew character at an address "0" of the RAM 42, saves a character code assigned to the second Hebrew character at an address "1" of the RAM 42, and so on so as to save the character codes that are information presenting the characters in sequence from the address "0" of the RAM 42.

Here, the downward arrow "↓" denotes a line break code. With the line break code being used as a delimiter, the entered character string "Hello↓World↓123" is divided into a first block character string "Hello," a second block character string "World," and a third block character string "123." When multiple lines can be printed because of a small character size or the like, multiple blocks of character strings are arranged and printed in the width direction of the tape material 31. For example as shown in FIG. 9, when the second block character string "World" and third block character string "123" are smaller in size than the first block character string "Hello" and the total height of these two character strings is smaller than the width of the tape material 31, the character strings "World" and "123" are arranged and printed in the width direction of the tape material 31. On the other hand, when multiple blocks of character strings cannot be arranged and printed in the width direction of the tape material 31, a space (blank) is printed. For easier understanding, the following explanation will be made on the assumption that the entered character strings are all equal in size and all character strings are printed in a line.

When input of a character string of multiple blocks of the left-to-right horizontal writing system is received by the input receiver 110, the saver 111 saves in the RAM 42 one or more characters included in the character string of the left-to-right horizontal writing system in the reverse order to the order of receiving the input both within a block and over the blocks. In other words, when input of a character string of three blocks "Hellow↓World↓123" is received as shown in FIG. 6A, the saver 111 saves in the RAM 42 the characters in the reverse order over the three blocks, namely "321↓dlroW↓olleH" as shown in FIG. 6B.

On the other hand, when input of a character string of multiple blocks of the right-to-left horizontal writing system is received by the input receiver 110, the saver 111 saves in the RAM 42 one or more characters included in the character string of the right-to-left horizontal writing system in the order of receiving the input both within a block and over the blocks. In other words, when input of a character string in which Hebrew character strings of the right-to-left horizontal writing system and a character string of numbers of the left-to-right horizontal writing system are mixed is received as shown in FIG. 7A, the saver 111 saves in the RAM 42 the characters of the right-to-left horizontal writing system included in the entered character strings in the order of receiving the input both within a block and over the blocks as shown in FIG. 7B. Then, the saver 111 saves in the RAM 42 the characters of the left-to-right horizontal writing system included in the entered character string in the reverse order to the order of receiving the input both within a block and over the blocks as in the case of receiving input of only characters of the left-to-right horizontal writing system.

The determiner 121 functions as determination means for determining whether a character string of which input is received by the input receiver 110 includes characters of the right-to-left horizontal writing system. In more detail, the determiner 121 reads the character codes saved in the RAM 42 and determines whether any character codes of the right-to-left horizontal writing system such as Hebrew and Arabic are included.

For example as shown in FIG. 5A, when the input-received character string includes only characters of the left-to-right horizontal writing system and includes no characters of the right-to-left horizontal writing system, the print result looks better in many cases if the character string is printed on the tape material 31 in left alignment, namely at a position with reference to the left end of the tape material 31. On the other hand, when the input-received character string includes only characters of the right-to-left horizontal writing system and includes no characters of the left-to-right horizontal writing system as shown in FIG. 5B and when the input-received character string includes characters of the right-to-left horizontal writing system in part as shown in FIGS. 5C to 5E, the print result looks better in many cases if the character string is printed on the tape material 31 in right alignment, namely at a position with reference to the right end of the tape material 31.

Therefore, the determiner 121 determines that the character string should be printed on the tape material 31 in left alignment (a first condition is satisfied) when the character string of which input is received by the input receiver 110 includes no characters of the right-to-left horizontal writing system. On the other hand, the determiner 121 determines that the character string should be printed on the tape material 31 in right alignment (a second condition is satisfied) when the character string of which input is received by the input receiver 110 includes some characters of the right-to-left horizontal writing system. The determiner 121 sends the determination result of printing the character string in left alignment or in right alignment to the reader 112.

The reader 112 functions as reading means for reading from the RAM 42 one or more characters saved in the RAM 42. In more detail, when the first condition for printing a character string in left alignment is satisfied, the reader 112 reads from the RAM 42 one or more characters saved in the RAM 42 in the order of characters to position on the left in the character string. On the other hand, when the second condition for printing a character in right alignment is satisfied, the reader 112 reads from the RAM 42 one or more characters saved in the RAM 42 in the order of characters to position on the right in the character string.

For example as shown in FIG. 6A, when input of only characters of the left-to-right horizontal writing system is received, the order of characters to position on the left in a character string corresponds to the order of receiving the input. In such a case, the input-received characters of the left-to-right horizontal writing system are saved in the RAM 42 in the reverse order to the order of receiving the input as shown in FIG. 6B. Therefore, when the first condition for printing a character string in left alignment is satisfied, the reader 112 reads from the RAM 42 the characters of the left-to-right horizontal writing system saved in the RAM 42 in the reverse order to the order of being saved in the RAM 42. In other words, the reader 112 reads the character string from the RAM 42 in the order "Hello↓World↓123" as shown in FIG. 6C.

Figure 7C:
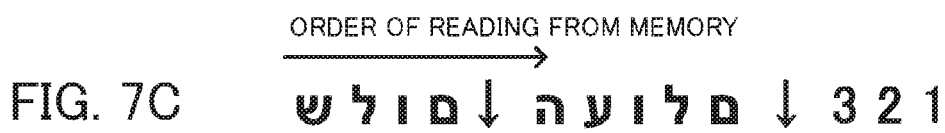

On the other hand, when input of a character string in which characters of the right-to-left horizontal writing system and characters of the left-to-right horizontal writing system are mixed is received as shown in FIG. 7A, the order of characters to position on the right in a character string corresponds to the reverse order to the order of receiving the input for a character string of the left-to-right horizontal writing system and corresponds to the order of receiving the input for a character string of the right-to-left horizontal writing system. In other words, in such a case, the order of characters to position on the right in a character string corresponds to the order of being saved in the RAM 42 shown in FIG. 7B. Therefore, when the second condition for printing a character string in right alignment is satisfied, the reader 112 reads from the RAM 42 the characters of the right-to-left horizontal writing system saved in the RAM 42 in the order of being saved in the RAM 42 as shown in FIG. 7C.

The print data creator 113 functions as print data creation means for arranging one or more characters read by the reader 112 in the order of being read to create non-inverted print data when the first condition for printing a character string in left alignment is satisfied, and arranging individually horizontally inverted characters of one or more characters read by the reader 112 in the order of being read to create inverted print data when the second condition for printing a character string in right alignment is satisfied.

For example as shown in FIG. 6A, when input of only characters of the left-to-right horizontal writing system is received, the print data creator 113 creates non-inverted print data 81 as shown in FIG. 6D. In more detail, the print data creator 113 reads font information stored in the ROM 41 each time one character is read from the RAM 42 by the reader 112, and acquires bitmap data corresponding to the read character to develop the read character. Then, the print data creator 113 reads layout information stored in the ROM 41 and arranges the one or more characters saved in the RAM 42 in the order of being read from the left according to the read layout information to create non-inverted print data 81 as shown in FIG. 6D. The layout information is information presenting settings of the distance from the end of the tape material 31 (margin size), character spacing in a character string, background image, and the like.

Figure 7D:
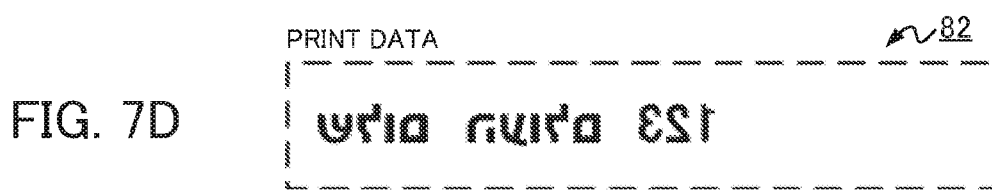

On the other hand, for example as shown in FIG. 7A, when input of a character string in which characters of the right-to-left horizontal writing system and characters of the left-to-right horizontal writing system are mixed is received, the print data creator 113 creates inverted print data 82 as shown in FIG. 7D. In more detail, the print data creator 113 reads font information stored in the ROM 41 each time one character is read from the RAM 42 by the reader 112, and acquires bitmap data corresponding to the read character to develop the read character. At this point, the print data creator 113 further horizontally inverts (mirror-inverts) the developed bitmap data. Then, the print data creator 113 reads layout information stored in the ROM 41 and arranges the one or more characters saved in the RAM 42 in the order of being read from the left according to the read layout information to create inverted print data 82 as shown in FIG. 7D.

Figure 7E:
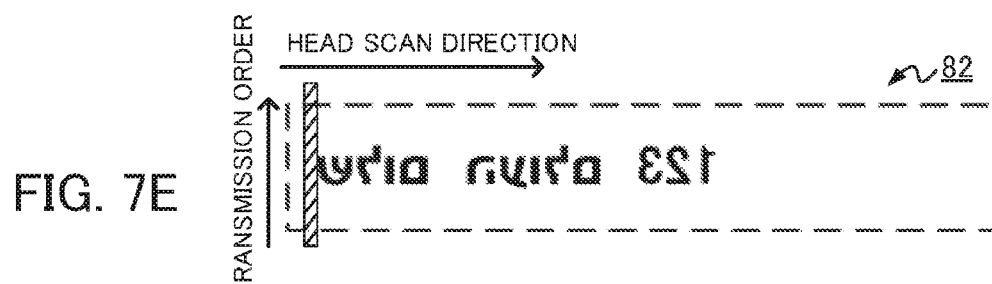

The created non-inverted print data 81 or inverted print data 82 are saved in a layout buffer. The layout buffer has a ring buffer structure. The print data creator 113 saves the created print data 81 or 82 in the layout buffer in sequence in an overwriting manner in sync with energization for printing by the printer 115. In other words, the print data 81 and 82 shown in FIGS. 6E and 7E are shown as bitmap data presenting all developed characters for easier understanding. However, the entire print data 81 or 82 are not generally saved in the layout buffer at a time. Moreover, with the ring buffer structure, the layout buffer memory usage can be suppressed.

The print data transmitter 114 functions as print data transmission means for sending the created non-inverted print data 81 to the print head 11 when the non-inverted print data 81 are created by the print data creator 113, and sending the created inverted print data 82 to the print head 11 in the upside-down order to that in transmission of the non-inverted print data 81 when the inverted print data 82 are created by the print data creator 113.

The printer 115 functions as printing means for printing with the print head 11 the characters sent to the print head 11 such that the characters are arranged closer to the leading end in the transfer direction of the tape material 31. In more detail, when one or more characters included in the non-inverted print data 81 are sent by the print data transmitter 114, the printer 115 prints with the print head 11 the one or more characters closer to the leading end in the transfer direction of the tape material 31. In such a case, with the printing being immediately started without advancing the unprinted tape material 31 before printing the first character sent to the print head 11, the one or more characters are printed closer to the leading end in the transfer direction of the tape material 31. Consequently, the one or more characters are printed in left alignment. On the other hand, when the horizontally inverted characters included in the inverted print data 82 are sent in the upside-down order by the print data transmitter 114, the printer 115 prints with the print head 11 the horizontally inverted characters closer to the leading end in the transfer direction of the tape material 31. Also in such a case, with the printing being immediately started without advancing the unprinted tape material 31 before printing the first character sent to the print head 11, the one or more characters are printed closer to the leading end in the transfer direction of the tape material 31. Consequently, the one or more characters are printed in right alignment.

For example as shown in FIG. 6A, when input of only characters of the left-to-right horizontal writing system is received, the print data transmitter 114 scans in the head scan direction and sends to the print head 11 the non-inverted print data 81 saved in the layout buffer one line (the shaded area) at a time as shown in FIG. 6E. At this point, the print data transmitter 114 sends to the print head 11 the print data 81 on each line in the order from top to bottom. The printer 115 prints one or more characters included in the sent non-inverted print data 81 closer to the leading end in the transfer direction of the tape material 31. Consequently, the print result as shown in FIG. 6F is obtained. In other words, the entered character string is arranged in the order of characters to position on the left and printed on the tape material 31 in left alignment so that the character string of the left-to-right horizontal writing system can be read from left to right.

Figure 7F:
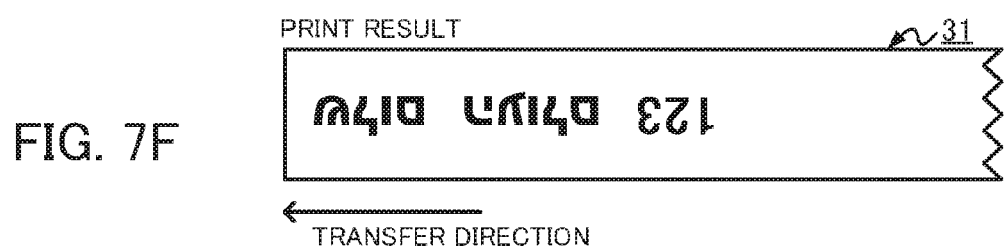

On the other hand, for example as shown in FIG. 7A, when input of a character string in which character strings of the right-to-left horizontal writing system and a character string of the left-to-right horizontal writing system are mixed is received, the print data transmitter 114 scans in the head scan direction and sends to the print head 11 the inverted print data 82 saved in the layout buffer one line (the shaded area) at a time as shown in FIG. 7E. At this point, the print data transmitter 114 sends to the print head 11 the print data 82 on each line in the order from bottom to top or in the reverse order to FIG. 6E. The printer 115 prints the horizontally inverted characters included in the inverted print data 82 sent in the upside-down order closer to the leading end in the transfer direction of the tape material 31. Consequently, the print result as show in FIG. 7F is obtained. In other words, the entered character string is arranged in the order of characters to position on the right and printed on the tape material 31 in right alignment so that the character string of the right-to-left horizontal writing system can be read from right to left.

The process flow of the printing procedure executed by the above-described printing device 101 according to Embodiment 1 will be described with reference to the flowchart shown in FIG. 10.

Figure 10:
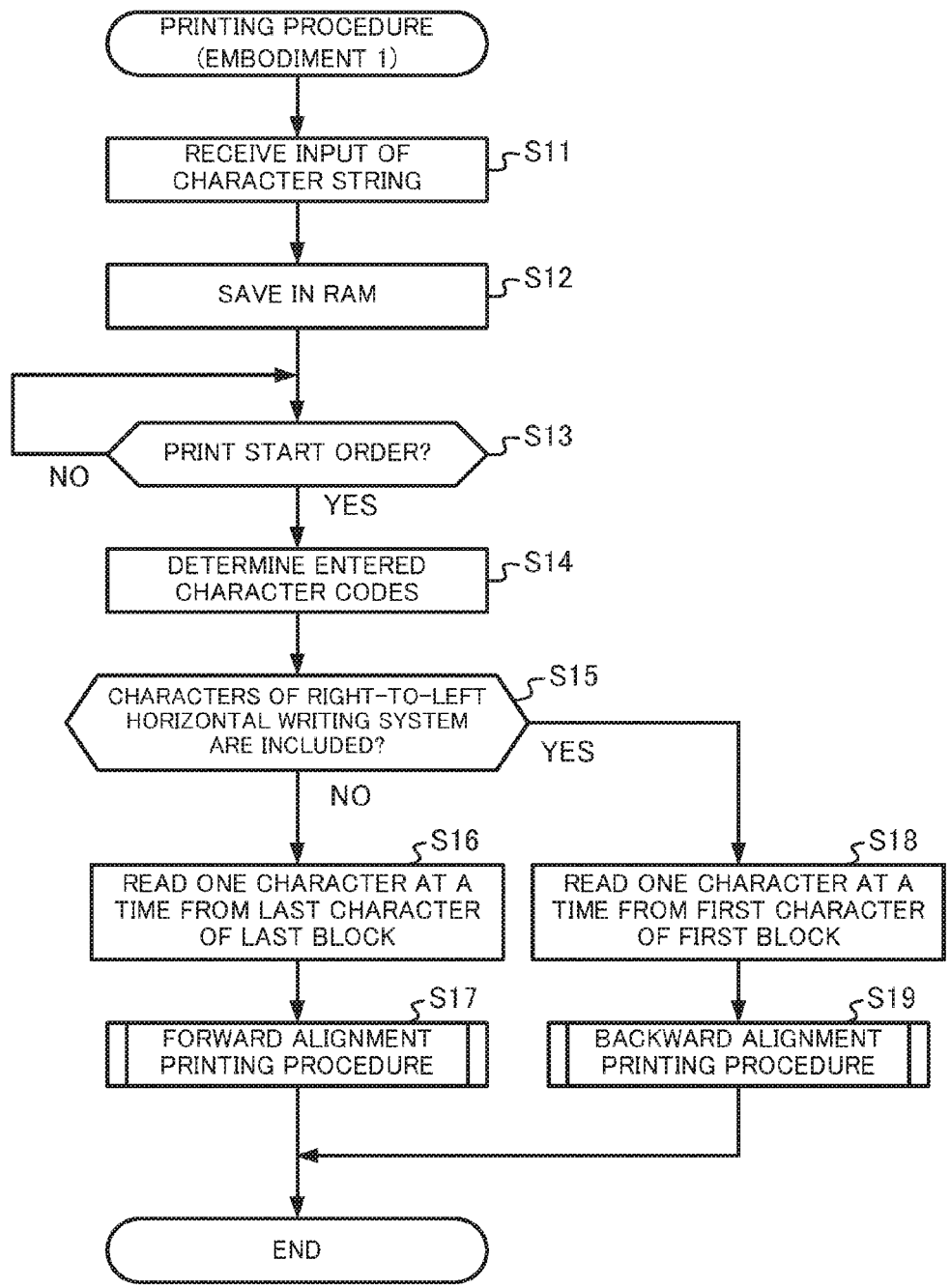
FIG. 10 is a flowchart showing the process flow of the printing procedure executed by the printing device according to Embodiment 1.

The flowchart shown in FIG. 10 starts, for example, when the user powers on the printing device 101 for printing a desired character string on the tape material 31 and the printing device 101 is booted up to the printable state.

As the procedure of the flowchart shown in FIG. 10 starts, the input receiver 110 receives input of a character string (Step S11). The saver 111 saves one or more characters included in the input-received character string in the RAM 42 (Step S12).

In more detail, when input of a character string of the left-to-right horizontal writing system is received by the input receiver 110 as shown in FIG. 6A, the saver 111 saves in the RAM 42 character codes of one or more characters included in the character string of the left-to-right horizontal writing system in the reverse order to the order of receiving the input as shown in FIGS. 6B and 8A. On the other hand, when input of a character string including characters of the right-to-left horizontal writing system is received by the input receiver 110 as shown in FIG. 7A, the saver 111 saves in the RAM 42 character codes of one or more characters included in the character string including characters of the right-to-left horizontal writing system in the order of receiving the input as shown in FIGS. 7B and 8B.

After the input-received character string is saved in the RAM 42, the determiner 121 determines whether a print start order is made (Step S13). For example, after completing input of a character string, the user enters an order to start a procedure to print the entered character string on the tape material 31 via the inputter 3. Unless such a print start order is made (Step S13; NO), the determiner 121 waits for such a print start order being made.

As a print start order is made (Step S13; Yes), the determiner 121 determines the character codes saved in the RAM 42 (Step S14) and determines whether the input-received character string includes any characters of the right-to-left horizontal writing system such as Hebrew (Step S15).

If the input-received character string includes no characters of the right-to-left horizontal writing system (Step S15; NO), the reader 112 reads the character codes of the characters one at a time from the last character of the last block (Step S16). In other words, the reader 112 reads from the RAM 42 one or more characters included in the character string of the left-to-right horizontal writing system saved in the RAM 42 in the reverse order to the order of being saved in the RAM 42 as shown in FIG. 6C.

Then, the printing device 101 executes a forward alignment printing procedure (Step S17). The forward alignment printing procedure will be described with reference to FIG. 11. Here, the "forward alignment" printing procedure means printing a character string in left alignment with the printing device comprising a printing mechanism for the left-to-right horizontal writing system according to this embodiment. The "forward alignment" printing procedure conversely means printing a character string in right alignment with a printing device comprising a printing mechanism for the right-to-left horizontal writing system as described later.

Figure 11:
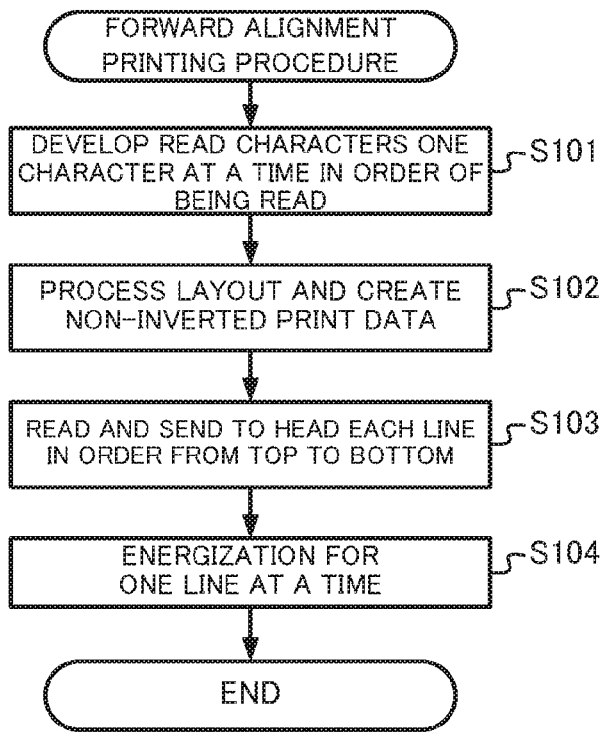
FIG. 11 is a flowchart showing the process flow of the forward alignment printing procedure.

In the flowchart (the forward alignment printing procedure) shown in FIG. 11, as characters are read from the RAM 42 by the reader 112 one character at a time, the print data creator 113 develops the read characters into bitmap data one character at a time in the order of being read (Step S101).

Then, the print data creator 113 executes layout processing to create non-inverted print data 81 (Step S102). In other words, the print data creator 113 reads layout information stored in the ROM 41 and arranges the one or more characters saved in the RAM 42 in the order of being read from the left according to the read layout information to create non-inverted print data 81 as shown in FIG. 6D.

As the non-inverted print data 81 are created, the print data transmitter 114 reads and sends to the head the created non-inverted print data 81 on each line in the order from top to bottom as shown in FIG. 6E (Step S103). Then, the printer 115 executes energization for one line at a time (Step S104). As a result, the printer 115 prints the input-received character string of the left-to-right horizontal writing system on the tape material 31. Consequently, the print result shown in FIG. 6F is obtained. Then, the forward alignment printing procedure shown in FIG. 11 ends.

On the other hand, if the input-received character string includes any characters of the right-to-left horizontal writing system in the determination of the Step S15 (Step S15: YES), the reader 112 reads the character codes of the characters one at a time from the first character of the first block (Step S18). In other words, the reader 112 reads from the RAM 42 one or more characters included in the character string including characters of the right-to-left horizontal writing system saved in the RAM 42 in the order of being saved in the RAM 42 as shown in FIG. 7C.

Then, the printing device 101 executes a backward alignment printing procedure (Step S19). The backward alignment printing procedure will be described with reference to FIG. 12. Here, the "backward alignment" printing procedure means printing a character string in right alignment with the printing device comprising a printing mechanism for the left-to-right horizontal writing system according to this embodiment. The "backward alignment" printing procedure conversely means printing a character string in left alignment with a printing device comprising a printing mechanism for the right-to-left horizontal writing system as described later.

Figure 12:
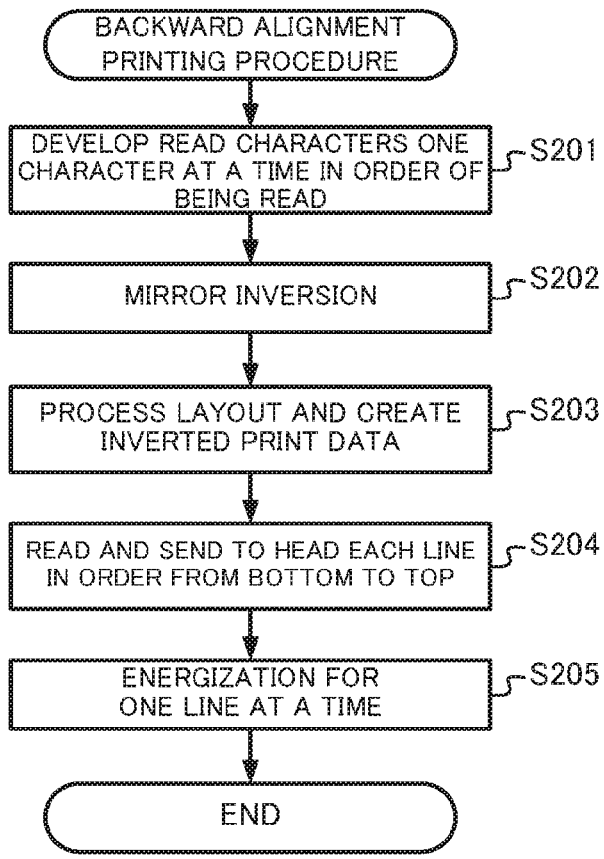
FIG. 12 is a flowchart showing the process flow of the backward alignment printing procedure.

In the flowchart (the backward alignment printing procedure) shown in FIG. 12, as characters are read from the RAM 42 one character at a time by the reader 112, the print data creator 113 develops the read characters into bitmap data one character at a time in the order of being read (Step S201).

As the read characters are developed into bitmap data, the print data creator 113 mirror-inverts the developed bitmap data (Step S202). In other words, the print data creator 113 creates bitmap data presenting the characters horizontally inverted.

Then, the print data creator 113 executes layout processing to create inverted print data 82 (Step S203). In more detail, the print data creator 113 reads layout information stored in the ROM 41 and arranges the one or more characters saved in the RAM 42 in the order of being read from the left according to the read layout information to create inverted print data 82 shown in FIG. 7D.

As the inverted print data 82 are created, the print data transmitter 114 reads and sends to the head the created inverted print data 82 on each line in the order from top to bottom as shown in FIG. 7E (Step S204). Then, the printer 115 executes energization for one line at a time (Step S205). As a result, the printer 115 prints the input-received character string including characters of the right-to-left horizontal writing system on the tape material 31. Consequently, the print result shown in FIG. 7F is obtained. Then, the backward alignment printing procedure shown in FIG. 12 and the printing procedure shown in FIG. 10 end.

As described above, the printing device 101 according to Embodiment 1 determines whether the input-received character string includes any characters of the right-to-left horizontal writing system such as Hebrew and changes the order of reading one or more characters saved in the RAM 42 according to the determination result. Then, the printing device 101 according to Embodiment 1 creates horizontally inverted print data and turns the order of sending the print data to the print head 11 upside down when the entered character string includes characters of the right-to-left horizontal writing system. Therefore, it is possible to print characters in sequence from the first character to read with a single printing device 101 having a single print outlet in both cases of including and not including characters of the right-to-left horizontal writing system.

Traditionally, for printing a character string in opposite alignment to the one the printing mechanism is specialized for, the character string has to be positioned closer to the tail end in the transfer direction of the tape material 31 (the position at which the tape material 31 is cut by the full-cut mechanism 17 or half-cut mechanism 18). Therefore, it is necessary to pre-calculate the length of a printed character string and the difference between the length of a label to create or the like and the length of the character string based on print settings and advance the unprinted tape material 31 by the length of a preceding margin based on the difference immediately before the printing. Therefore, the print start position (the margin from the leading end) has to be adjusted with reference to the leading end of the tape material 31, whereby the processing becomes complex and it is difficult to obtain a print result in which the character string is properly positioned.

Conversely, the printing device 101 according to Embodiment 1 can print a character string closer to the leading end in the transfer direction of the tape material 31 both in printing a character string of the left-to-right horizontal writing system in left alignment and in printing a character string including characters of the right-to-left horizontal writing system in right alignment. Therefore, a proper print result with good appearance can be obtained. Moreover, the same system and format can be used for printing a character string of the left-to-right horizontal writing system in left alignment and for printing a character string including characters of the right-to-left horizontal writing system in right alignment, whereby the memory can be saved and cost can be reduced as well. Particularly, because of presence of composite characters and the like, characters of Hebrew and the like have to be treated in units of multiple characters. Therefore, a printing device specialized for Hebrew and the like requires a large memory compared to a printing device specialized for Japanese and Western languages. It is significantly effective to be able to save the memory. Moreover, in the printing device 101 according to Embodiment 1, the determiner 121 automatically determines whether to print a character string on the tape material 31 in left alignment or in right alignment based on the character codes of the input-received character string without being specified by the user, whereby it is more convenient.

Embodiment 2

Embodiment 2 of the present disclosure is described next.

The above-described printing device 101 according to Embodiment 1 determines whether the character string of which input is received by the input receiver 110 includes any characters of the right-to-left horizontal writing system and executes a different printing procedure depending on the determination result. On the other hand, the printing device according to Embodiment 2 receives specification of accepting or not accepting input of characters of the right-to-left horizontal writing system before input of a character string and executes a different printing procedure depending on the specification. Details are described below.

Figure 13:
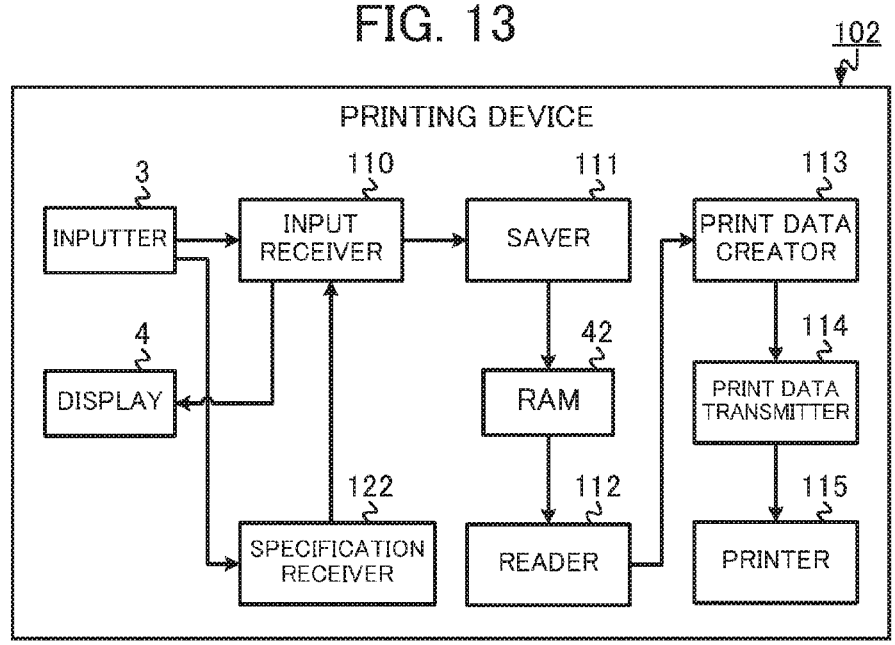
FIG. 13 is a block diagram showing the functional configuration of the printing device according to Embodiment 2.

FIG. 13 shows the functional configuration of a printing device 102 according to Embodiment 2. The printing device 102 comprises an input receiver 110, a saver 111, a reader 112, a print data creator 113, a print data transmitter 114, a printer 115, and a specification receiver 122. The controller 40 reads programs stored in the ROM 41 into the RAM 42 and executes/controls the read programs to function as the above components. Here the printing device 102 according to Embodiment 2 has the same appearance and physical configuration as the printing device 101 according to Embodiment 1. Therefore, detailed explanation is omitted here.

The specification receiver 122 functions as specification receiving means for receiving specification of accepting or not accepting input of characters of the second writing system in which writing proceeds from right to left (the right-to-left horizontal writing system) at the input receiver 110.

Figure 14:
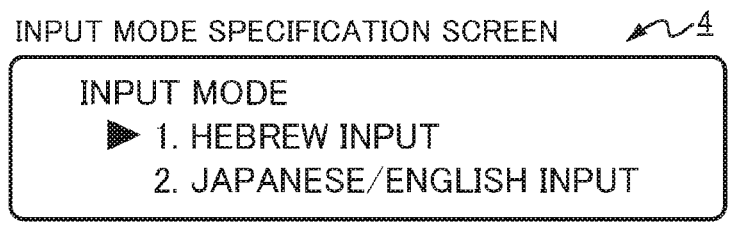
FIG. 14 is an illustration showing an example of the input mode specification screen.

In more detail, the specification receiver 122 displays on the display screen of the display 4 an input mode specification screen, for example, as shown in FIG. 14 before the input receiver 110 receives input of a character string. The user can specify on the input mode screen shown in FIG. 14 in which mode the user enters a character string, an input mode "HEBREW INPUT" that is an input mode accepting input of characters of the right-to-left horizontal writing system or an input mode "JAPANESE/ENGLISH INPUT" that is an input mode not accepting input of characters of the right-to-left horizontal writing system so as to switch the input mode.

The input receiver 110 receives input of a character string of the left-to-right horizontal writing system when the input mode not accepting input of characters of the right-to-left horizontal writing system is specified by the specification receiver 122, and receives input of a character string including characters of the right-to-left horizontal writing system when the input mode accepting input of characters of the right-to-left horizontal writing system is specified by the specification receiver 122.

In more detail, when the input mode not accepting input of characters of the right-to-left horizontal writing system is specified by the specification receiver 122, the input receiver 110 receives only characters of the left-to-right horizontal writing system, for example, as shown in FIG. 5A. On the other hand, when the input mode accepting input of characters of the right-to-left horizontal writing system is specified by the specification receiver 122, the input receiver 110 can receive input of not only characters of the right-to-left horizontal writing system shown in FIG. 5B but also a character string in which characters of the right-to-left horizontal writing system and characters of the left-to-right horizontal writing system are mixed as shown in FIGS. 5C to 5E.

When the input mode accepting input of characters of the right-to-left horizontal writing system is specified by the specification receiver 122, a character string including characters of the right-to-left horizontal writing system is entered, whereby the print result looks better in many cases if the character string is printed on the tape material 31 in right alignment. Therefore, the printing device 102 determines that the character string should be printed on the tape material 31 in right alignment (the second condition is satisfied). When the second condition for printing a character string in right alignment is satisfied as in this case, the saver 111, reader 112, print data creator 113, print data transmitter 114, and printer 115 execute the same processing as described in Embodiment 1 with reference to FIGS. 7A to 7F, namely the processing executed when the determiner 121 determines that the character string of which input is received by the input receiver 110 includes characters of the right-to-left horizontal writing system.

In other words, when input of a character string including characters of the right-to-left horizontal writing system is received as shown in FIG. 7A, the saver 111 saves the characters of the right-to-left horizontal writing system included in the entered character string in the RAM 42 in the order of receiving the input as shown in FIG. 7B. Then, the saver 111 saves the characters of the left-to-right horizontal writing system included in the entered character string in the RAM 42 in the reverse order to the order of receiving the input as in the case of receiving input of only characters of the left-to-right horizontal writing system. The reader 112 reads from the RAM 42 one or more characters included in the character string of the right-to-left horizontal writing system saved in the RAM 42 in the order of being saved in the RAM 42 as shown in FIG. 7C. The print data creator 113 arranges individually horizontally inverted characters of multiple characters read by the reader 112 in the order of being read to create inverted print data 82 as shown in FIG. 7D. The print data transmitter 114 sends to the print head 11 the created inverted print data 82 on each line in the upside-down order as shown in FIG. 7E. The printer 115 prints with the print head 11 the horizontally inverted characters included in the inverted print data 82 sent to the print head 11 in the upside-down order closer to the leading end in the transfer direction of the tape material 31. As a result, the print result as shown in FIG. 7F is obtained.

On the other hand, when the input mode for the left-to-right horizontal writing system is specified by the specification receiver 122, only characters of the left-to-right horizontal writing system are entered, whereby the print result looks better in many cases if the character string is printed on the tape material 31 in left alignment. Therefore, the printing device 102 determines that the character string should be printed on the tape material 31 in left alignment (the first condition is satisfied). The procedure executed when the first condition for printing a character string in left alignment is satisfied as in this case will be described below with reference to FIGS. 15A to 15F.

When the input mode not accepting input of characters of the right-to-left horizontal writing system is specified by the specification receiver 122, the saver 111 saves one or more characters included in the character string of the left-to-right horizontal writing system of which input is received by the input receiver 110 in the RAM 42 in the order of receiving the input both within a block and over the blocks. For example as shown in FIG. 15A, when input of a character string of the left-to-right horizontal writing system, "Hello↓World↓123," is received, the saver 111 saves one or more characters included in the input-received character string of the left-to-right horizontal writing system in the RAM 42 in the order "Hello↓World↓123" as shown in FIG. 15B.

When the input mode not accepting input of characters of the right-to-left horizontal writing system is specified by the specification receiver 122, the reader 112 reads from the RAM 42 the one or more characters saved in the RAM 42 in the order of characters to position on the left in the character string.

For example as shown in FIG. 15A, when input of a character string of the left-to-right horizontal writing system is received, the order of characters to position on the left in the character string corresponds to the order of receiving the input. In such a case, one or more characters included in the input-received character string of the left-to-right horizontal writing system are saved in the RAM 42 in the order of receiving the input as shown in FIG. 15B. Therefore, when the input mode not accepting input of characters of the right-to-left horizontal writing system is specified, the reader 112 reads from the RAM 42 the one or more characters included in the character string of the left-to-right horizontal writing system saved in the RAM 42 in the order of being saved in the RAM 42. In other words, the reader 112 reads the character string from the RAM 42 in the order "Hello↓World↓123" as shown in FIG. 15C.

When the input mode not accepting input of characters of the right-to-left horizontal writing system is specified by the specification receiver 122, the print data creator 113 arranges the one or more characters read by the reader 112 in the order of being read to create non-inverted print data.

For example as shown in FIG. 15A, when input of a character string "Hello↓World↓123" is received, the print data creator 113 develops the characters read from the RAM 42 by the reader 112 into bitmap data. Then, the print data creator 113 reads layout information stored in the ROM 41 and arranges the one or more characters saved in the RAM 42 in the order of being read from the left according to the read layout information to create non-inverted print data 83 as shown in FIG. 15D.

When the non-inverted print data 83 are created by the print data creator 113, the print data transmitter 114 sends the created non-inverted print data 83 to the print head 11.

For example as shown in FIG. 15A, when input of a character string "Hello↓World↓123" is received, the print data transmitter 114 scans in the head scan direction and sends to the print head 11 the non-inverted print data 83 saved in the layout buffer one line (the shaded area) at a time as shown in FIG. 15E. At this point, the print data transmitter 114 sends to the print head 11 the print data 83 on each line in the order from top to bottom.

The printer 115 prints with the print head 11 the one or more characters included in the non-inverted print data 83 sent to the print head 11 by the print data transmitter 114 such that the one or more characters are arranged closer to the leading end in the transfer direction of the tape material 31. In such a case, with the printing being immediately started without advancing the unprinted tape material 31 before printing the first character sent to the print head 11, the one or more characters are printed closer to the leading end in the transfer direction of the tape material 31. Consequently, the entered character string is arranged in the order of characters to position on the left and printed on the tape material 31 in left alignment.

The process flow of the printing procedure executed by the above-described printing device 102 according to Embodiment 2 will be described with reference to the flowchart shown in FIG. 16.

Figure 16:
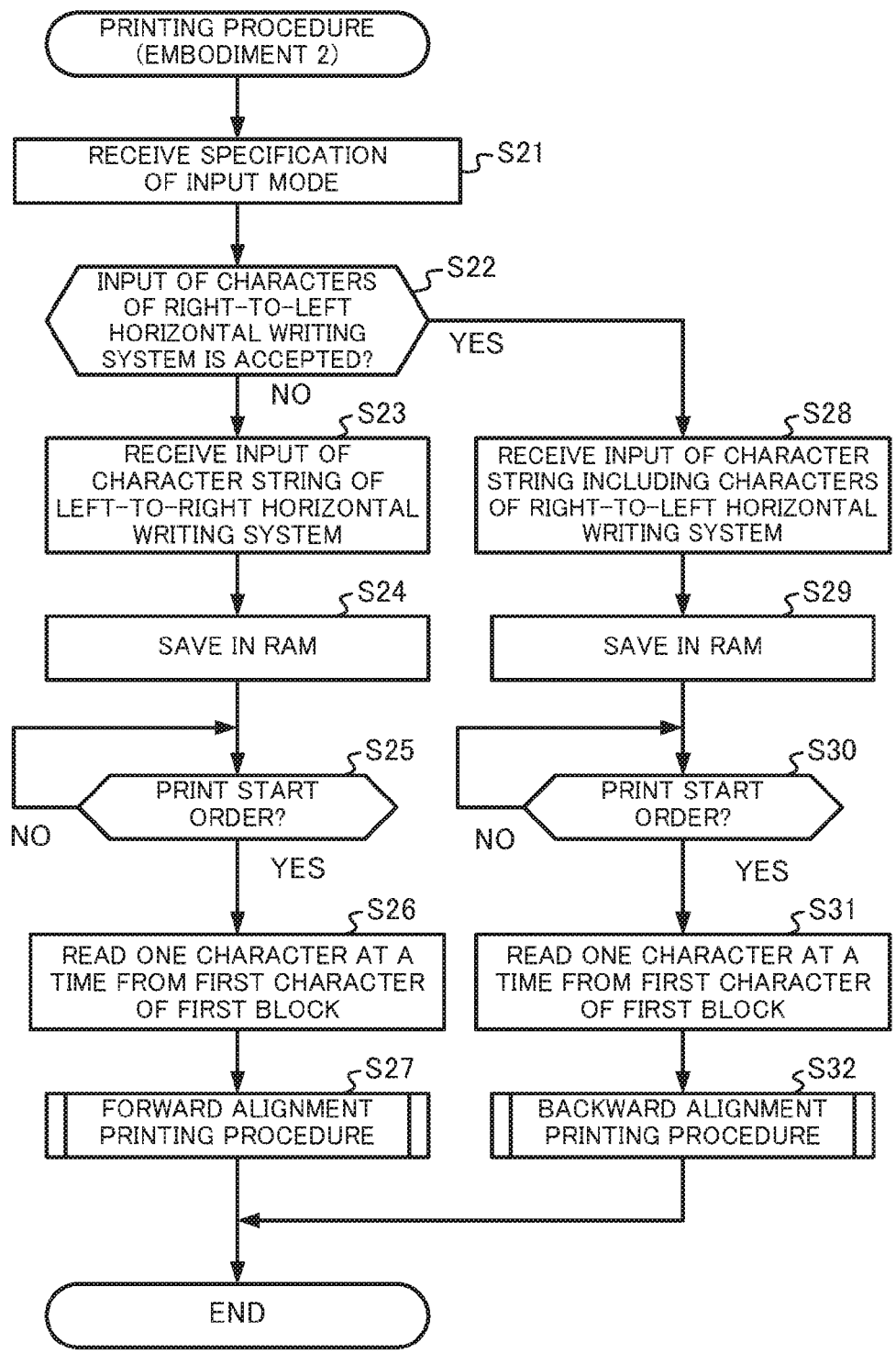
FIG. 16 is a flowchart showing the process flow of the printing procedure executed by the printing device according to Embodiment 2.

The flowchart shown in FIG. 16 starts, for example, when the user powers on the printing device 102 for printing a desired character string on the tape material 31 and the printing device 102 is booted up to the printable state.

As the procedure of the flowchart shown in FIG. 16 starts, the specification receiver 122 receives specification of the input mode (Step S21) and determines whether to accept input of characters of the right-to-left horizontal writing system (Step S22). For example, the user specifies on the input mode specification screen shown in FIG. 14 via the inputter 3 either the input mode accepting input of characters of the right-to-left horizontal writing system for entering a character string of the right-to-left horizontal writing system such as Hebrew or the input mode not accepting input of characters of the right-to-left horizontal writing system for entering a character string of the left-to-right horizontal writing system such as Japanese and English.

When the input mode not accepting input of characters of the right-to-left horizontal writing system is specified (Step S22; NO), the input receiver 110 receives input of a character string of the left-to-right horizontal writing system (Step S23). The saver 111 saves one or more characters included in the input-received character string of the left-to-right horizontal writing system in the RAM 42 (Step S24).

In more detail, when input of a character string of the left-to-right horizontal writing system is received by the input receiver 110 as shown in FIG. 15A, the saver 111 saves one or more characters included in the character string of the left-to-right horizontal writing system in the RAM 42 in the order of receiving the input as shown in FIG. 15B.

As the input-received characters are saved in the RAM 42, the reader 112 determines whether a print start order is made (Step S25). Unless a print start order is made (Step S25; NO), the reader 112 waits for a print start order being made.

As a print start order is made (Step S25; YES), the reader 112 reads character codes of the characters one at a time from the first character of the first block (Step S26). In other words, the reader 112 reads from the RAM 42 the one or more characters included in the character string of the left-to-right horizontal writing system saved in the RAM 42 in the order of being saved in the RAM 42 as shown in FIG. 15C.

Then, the printing device 102 executes a forward alignment printing procedure (Step S27). This forward alignment printing procedure is the same procedure as described in Embodiment 1 with reference to the flowchart shown in FIG. 11. In other words, the print data creator 113 develops the read characters into bitmap data one character at a time in the order of being read to create the non-inverted print data 83 as shown in FIG. 15D. Then, the print data transmitter 114 reads and sends to the head the print data 83 on each line in the order from top to bottom as shown in FIG. 15E. The printer 115 executes energization for one line at a time to print the input-received character string of the left-to-right horizontal writing system on the tape material 31. Consequently, the print result shown in FIG. 15F is obtained.

On the other hand, if the input mode accepting input of characters of the right-to-left horizontal writing system is specified in the Step S22 (Step S22; YES), the input receiver 110 receives input of a character string including characters of the right-to-left horizontal writing system (Step S28). The saver 111 saves one or more characters included in the input-received character string in the RAM 42 (Step S29).

In more detail, when input of a character string including characters of the right-to-left horizontal writing system is received by the input receiver 110 as shown in FIG. 7A, the saver 111 saves one or more characters included in the character string including characters of the right-to-left horizontal writing system in the RAM 42 in the order of receiving the input as shown in FIG. 7B.

As the input-received characters are saved in RAM 42, the reader 112 determines whether a print start order is made (Step S30). Unless a print start order is made (Step S30; NO), the reader 112 waits for a print start order being made.

As a print start order is made (Step S30; YES), the reader 112 reads character codes of the characters one at a time from the first character of the first block (Step S31). In other words, the reader 112 reads from the RAM 42 the one or more characters included in the character string including characters of the right-to-left horizontal writing system saved in the RAM 42 in the order of being saved in the RAM 42 as shown in FIG. 7C.

Then, the printing device 102 executes a backward alignment printing procedure (Step S32). This backward alignment printing procedure is the same procedure as described in Embodiment 1 with reference to the flowchart shown in FIG. 12. In other words, the print data creator 113 develops the read characters into bitmap data one character at a time in the order of being read and mirror-inverts the bitmap data of each character to create the inverted print data 82 as shown in FIG. 7D. Then, the print data transmitter 114 reads and sends to the head the print data 82 on each line in the order from bottom to top as shown in FIG. 7E. The printer 115 executes energization for one line at a time to print the input-received character string including characters of the right-to-left horizontal writing system on the tape material 31. Consequently, the print result shown in FIG. 7F is obtained. Then, the printing procedure shown in FIG. 16 ends.

As described above, the printing device 102 according to Embodiment 2 receives input mode specification as to whether to accept input of characters of the right-to-left horizontal writing system, and executes the printing procedure for the left-to-right horizontal writing system when the input mode not accepting input of characters of the right-to-left horizontal writing system is specified and executes the printing procedure for the right-to-left horizontal writing system when the input mode accepting input of characters of the right-to-left horizontal writing system is specified. Particularly, when the input mode accepting input of characters of the right-to-left horizontal writing system is specified, the printing device 102 creates horizontally inverted print data and turns the order of sending the print data to the print head 11 upside down. Therefore, it is possible to print characters in sequence from the first character to read with a single printing device 102 having a single print outlet in both cases of accepting and not accepting input of characters of the right-to-left horizontal writing system.

Moreover, with the printing being immediately started without advancing the unprinted tape material 31 before printing the first character sent to the print head 11, the character string can be printed closer to the leading end in the transfer direction of the tape material 31 both in printing a character string of the left-to-right horizontal writing system in left alignment and in printing a character string including characters of the right-to-left horizontal in right alignment. Therefore, a proper print result with good appearance can be obtained. Moreover, the same system and format can be used for printing a character string of the left-to-right horizontal writing system in left alignment and for printing a character string including characters of the right-to-left horizontal writing system in right alignment, whereby the memory can be saved and cost can be reduced. Moreover, the user himself can switch the input mode and therefore print a character string with a high degree of freedom.

Embodiment 3

Embodiment 3 of the present disclosure is described next.

The above-described printing devices 101 and 102 according to Embodiments 1 and 2 receive input of characters of both the left-to-right horizontal writing system and right-to-left horizontal writing system. Conversely, the printing device according to Embodiment 3 receives characters of only the left-to-right horizontal writing system. Then, the printing device according to Embodiment 3 prints the input-received characters of the left-to-right horizontal writing system on the tape material 31 either in left alignment or in right alignment according to the user selection. Details will be described below.

Figure 17:
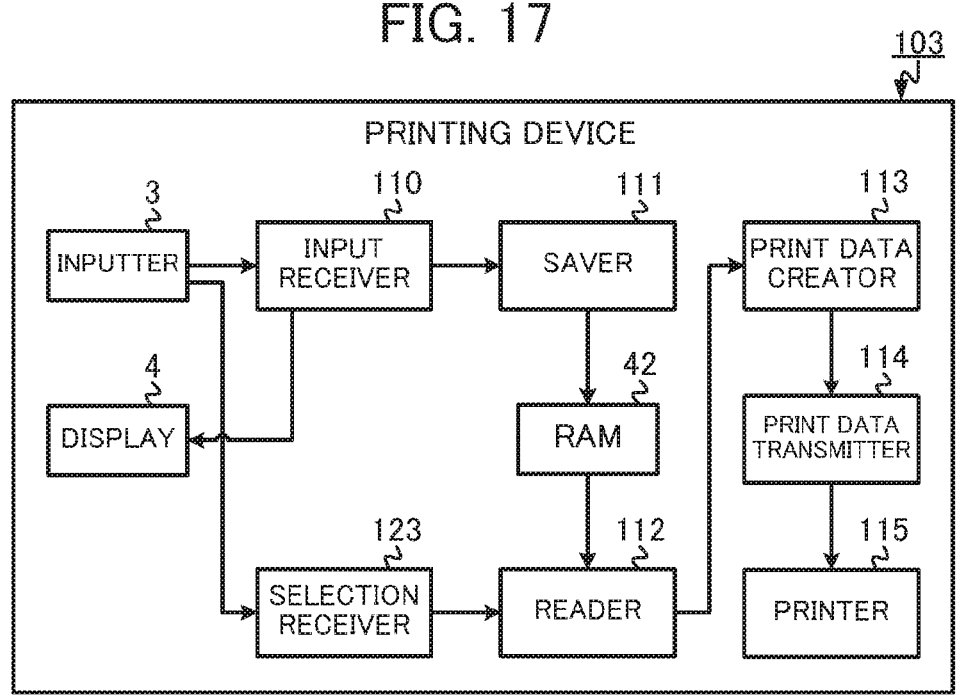
FIG. 17 is a block diagram showing the functional configuration of the printing device according to Embodiment 3.

FIG. 17 shows the functional configuration of a printing device 103 according to Embodiment 3. The printing device 103 comprises an input receiver 110, a saver 111, a reader 112, a print data creator 113, a print data transmitter 114, a printer 115, and a selection receiver 123. The controller 40 reads programs stored in the ROM 41 into the RAM 42 and executes/controls the read programs to function as the above components. Here, the printing device 103 according to Embodiment 3 has the same appearance and physical configuration as the printing devices 101 and 102 according to Embodiments 1 and 2. Therefore, detailed explanation is omitted here.

The input receiver 110 receives input of characters of the first writing system in which writing proceeds from left to right (the left-to-right horizontal writing system). In other words, the input receiver 110 receives only characters of the left-to-right horizontal writing system, for example, as shown in FIG. 5A.

The saver 111 saves the characters of the left-to-right horizontal writing system of which input is received by the input receiver 110 in the RAM 42 in the order of receiving the input. For example as shown in FIG. 19A, when input of a character string of the left-to-right horizontal writing system, "Hellow↓World↓123," is received, the saver 111 saves one or more characters included in the input-received character string of the left-to-right horizontal writing system in the RAM 42 in the order "Hellow↓World↓123" as shown in FIG. 19B.

The selection receiver 123 receives selection as to whether to print the character string of which input is received by the input receiver 110 on the tape material 31 in left alignment or in right alignment.

Figure 18:
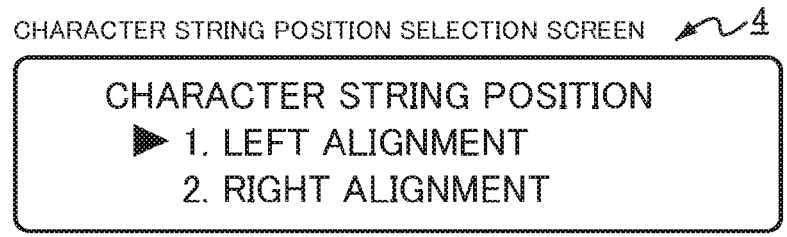
FIG. 18 is an illustration showing an example of the character string position selection screen.

In more detail, the selection receiver 123 displays a character string position selection screen, for example, as shown in FIG. 18 on the display screen of the display 4. The user can select either "LEFT ALIGNMENT" or "RIGHT ALIGNMENT" on the character string position selection screen shown in FIG. 18 as the character string position on the tape material 31.

When the left alignment is selected by the selection receiver 123, the printing device 103 prints the input-received character string of the left-to-right horizontal writing system on the tape material 31 in left alignment. When the left alignment is selected as just described (when the first condition is satisfied), the reader 112, print data creator 113, and print data transmitter 114 execute the same processing as described in Embodiment 2 with reference to FIGS. 15A to 15F, namely the processing executed when the input mode not accepting input of characters of the right-to-left horizontal writing system is specified by the specification receiver 122.

In other words, when input of a character string "Hellow↓World↓123" is received as shown in FIG. 15A and one or more characters included in the input-received character string are saved in the RAM 42 in the order "Hellow↓World↓123" as shown in FIG. 15B, the reader 112 reads from the RAM 42 the one or more characters included in the character string of the left-to-right horizontal writing system saved in the RAM 42 in the order of being saved in the RAM 42 as shown in FIG. 15C. The print data creator 113 arranges the one or more characters read by the reader 112 in the order of being read to create the non-inverted print data 83 as shown in FIG. 15D. The print data transmitter 114 sends to the print head 11 the created non-inverted print data 83 on each line in the order from top to bottom as shown in FIG. 15E. The printer 115 prints with the print head 11 the one or more characters included in the non-inverted print data 83 sent to the print head 11 such that the one or more characters are arranged closer to the leading end in the transfer direction of the tape material 31. In such a case, with the printing being immediately started without advancing the unprinted tape material 31 before printing the first character sent to the print head 11, the one or more characters are printed on the tape material 31 such that the one or more characters are arranged closer to the leading end in the transfer direction of the tape material 31. As a result, the print result shown in FIG. 15F is obtained.

On the other hand, when the right alignment is selected by the selection receiver 123, the printing device 103 prints the input-received character string of the left-to-right horizontal writing system on the tape material 31 in right alignment. The procedure executed when the right alignment is selected as just described (the second condition is satisfied) will be described below with reference to FIGS. 19C to 19F.

When the right alignment is selected by the selection receiver 123, the reader 112 reads from the RAM 42 the one or more characters saved in the RAM 42 in the order of characters to position on the right in the character string.

For example as shown in FIG. 19A, when input of a character string of the left-to-right horizontal writing system is received, the order of characters to position on the right in the character string corresponds to the reverse order to the order of receiving the input. In such a case, one or more characters included in the input-received character string of the left-to-right horizontal writing system are saved in the RAM 42 in the order of receiving the input as shown in FIG. 19B. Therefore, when the right alignment is selected, the reader 112 reads from the RAM 42 the one or more characters included in the character string of the left-to-right horizontal writing system saved in the RAM 42 in the reverse order to the order of being saved in the RAM 42. In other words, the reader 112 reads the character string from the RAM 42 in the order "321↓dlroW↓olleH" as shown in FIG. 19C.

When the right alignment is selected by the selection receiver 123, the print data creator 113 arranges individually horizontally inverted characters of the one or more characters read by the reader 112 in the order of being read to create inverted print data.

For example as shown in FIG. 19A, when input of a character string "Hellow↓World↓123" is received, the print data creator 113 develops the characters read from the RAM 42 by the reader 112 into bitmap data. At this point, the print data creator 113 further horizontally inverts (mirror-inverts) the developed bitmap data. Then, the print data creator 113 reads layout information stored in the ROM 41 and arranges the one or more characters saved in the RAM 42 in the order of being read from the left according to the read layout information to create inverted print data 84 as shown in FIG. 19D.

When the inverted print data 84 are created by the print data creator 113, the print data transmitter 114 sends the created inverted print data 84 to the print head 11 in the upside-down order to that in transmission of the non-inverted print data 83.

For example as shown in FIG. 19A, when input of a character string "Hellow↓World↓123" is received, the print data transmitter 114 scans in the head scan direction and sends to the print head 11 the inverted print data 84 saved in the layout buffer one line (the shaded are) at a time as shown in FIG. 19E. At this point, the print data transmitter 114 sends to the print head 11 the print data 84 on each line in the order from bottom to top.

The printer 115 prints with the print head 11 the horizontally inverted characters included in the inverted print data 84 sent to the print head 11 by the print data transmitter 114 such that the horizontally inverted characters are arranged closer to the leading end in the transfer direction of the tape material 31. In such a case, with the printing being immediately started without advancing the unprinted tape material 31 before printing the first character sent to the print head 11, the one or more characters are printed closer to the leading end in the transfer direction of the tape material 31. Consequently, the entered character string is arranged in the order of characters to position on the right and printed on the tape material 31 in right alignment as shown in FIG. 9F.

The process flow of the printing procedure executed by the above-described printing device 103 according to Embodiment 3 will be described with reference to the flowchart shown in FIG. 20.

Figure 20:
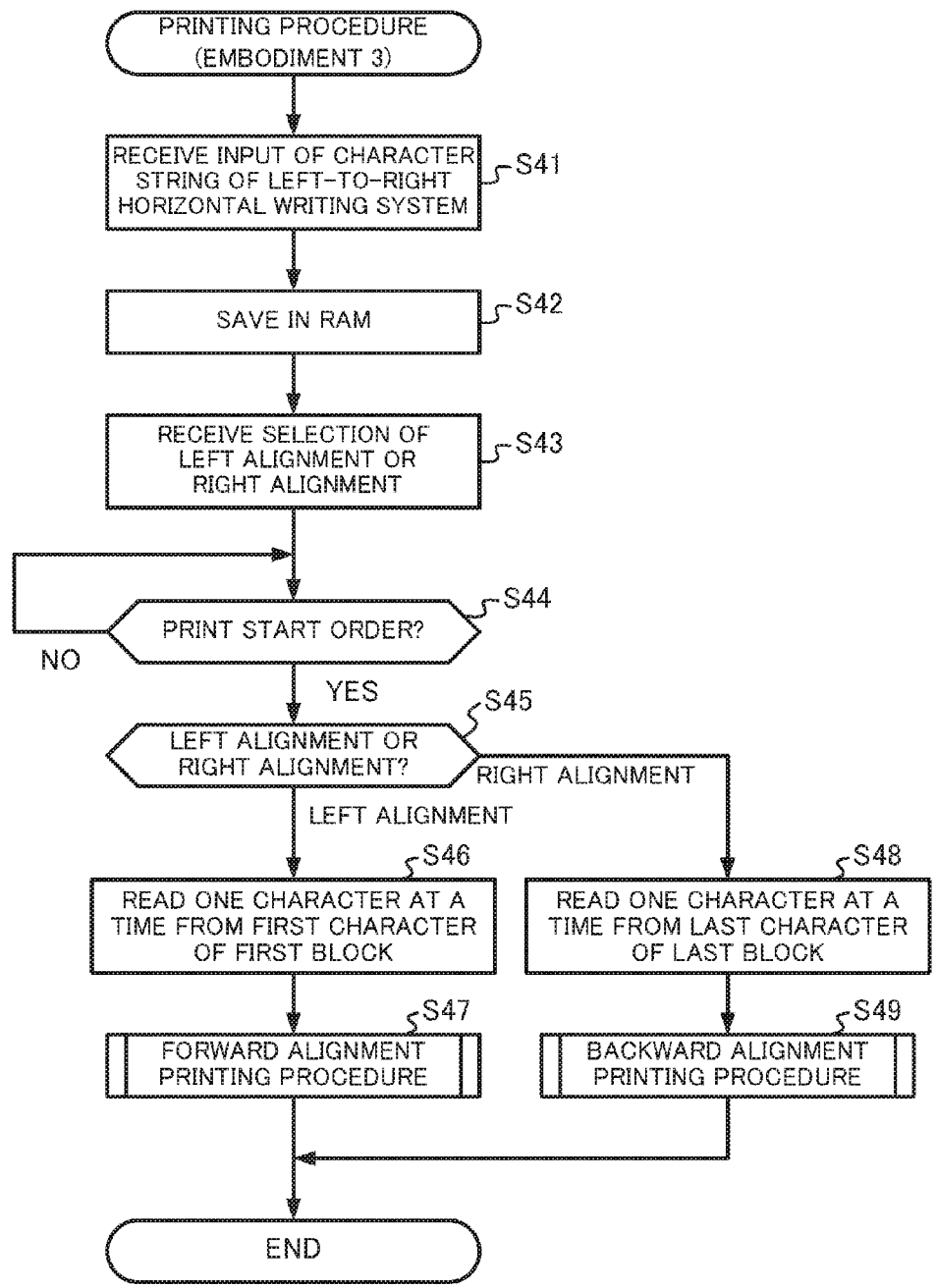
FIG. 20 is a flowchart showing the process flow of the printing procedure executed by the printing device according to Embodiment 3.

The flowchart shown in FIG. 20 starts, for example, when the user powers on the printing device 103 for printing a desired character string on the tape material 31 and the printing device 103 is booted up to the printable state.

As the procedure of the flowchart shown in FIG. 20 starts, the input receiver 110 receives input of a character string of the left-to-right horizontal writing system (Step S41). The saver 111 saves one or more characters included in the input-received character string in the RAM 42 (Step S42).

In more detail, when input of a character string of the left-to-right horizontal writing system is received by the input receiver 110 as shown in FIG. 19A, the saver 111 saves character codes of one or more characters included in the character string of the left-to-right horizontal writing system in the RAM 42 in the order of receiving the input as shown in FIG. 19B.

As the input-received character string is saved in the RAM 42, the selection receiver 123 receives selection of left alignment or right alignment (Step S43). For example, the user selects on the character string position selection screen shown in FIG. 18 via the inputter 3 whether to print the entered character string on the tape material 31 in left alignment or in right alignment.

After selection of left alignment or right alignment is received by the selection receiver 123, the reader 112 determines whether a print start order is made (Step S44). Unless a print start order is made (Step S44; NO), the reader 112 waits for a print start order being made.

As a print start order is made (Step S44; YES), the reader 112 determines whether the selection received by the selection receiver 123 is left alignment or right alignment (Step S45). If the left alignment is selected (Step S45: LEFT ALIGNMENT), the reader 112 reads the character codes of the characters one at a time from the first character of the first block (Step S46). In other words, the reader 112 reads from the RAM 42 the one or more characters included in the character string of the left-to-right horizontal writing system saved in the RAM 42 in the order of being saved in the RAM 42 as shown in FIG. 15C.

Then, the printing device 101 executes a forward alignment printing procedure (Step S47). This forward printing procedure is the same procedure as described in Embodiment 1 with reference to the flowchart shown in FIG. 11. In other words, the print data creator 113 develops the read characters into bitmap data one character at a time in the order of being read to create the non-inverted print data 83 as shown in FIG. 15D. Then, the print data transmitter 114 reads and sends to the head the print data 83 on each line in the order from top to bottom as shown in FIG. 15E. The printer 115 executes energization for one line at a time to print the input-received character string of the left-to-right horizontal writing system on the tape material 31 at a position with reference to the left end. Consequently, the print result shown in FIG. 15F is obtained.

On the other hand, if the right alignment is selected in the Step S45 (Step S45; RIGHT ALIGNMENT), the reader 112 reads the character codes of the characters one at a time from the last character of the last block (Step S48). In other words, the reader 112 reads from the RAM 42 the one or more characters included in the character string of the left-to-right horizontal writing system saved in the RAM 42 in the reverse order to the order of being saved in the RAM 42 as shown in FIG. 19C.

Then, the printing device 103 executes a backward alignment printing procedure (Step S49). This backward alignment printing procedure is the same procedure as described in Embodiment 1 with reference to the flowchart shown in FIG. 12. In other words, the print data creator 113 develops the read characters into bitmap data one character at a time in the order of being read and mirror-inverts the bitmap data of each character to create the inverted print data 84 as shown in FIG. 19D. Then, the print data transmitter 114 reads and sends to the head the print data 84 on each line in the order from bottom to top as shown in FIG. 19E. The printer 115 executes energization for one line at a time to print the input-received character string of the left-to-right horizontal writing system on the tape material 31 at a position with reference to the right end. Consequently, the print result shown in FIG. 19F is obtained. Then, the printing procedure shown in FIG. 20 ends.

As described above, the printing device 103 according to Embodiment 3 receives selection as to whether to print an input-received character string of the left-to-right horizontal writing system on the tape material 31 in left alignment or in right alignment. Then, in the case of printing the character string in right alignment, the printing device 103 according to Embodiment 3 creates horizontally inverted print data and turns the order of sending the print data to the print head 11 upside down. Therefore, it is possible to print characters from the character closer to the reference end with a single printing device 103 having a single print outlet both in printing in left alignment and in printing in right alignment.

Moreover, with the printing being immediately started without advancing the unprinted tape material 31 before printing the first character sent to the print head 11, the character string can be printed closer to the leading end in the transfer direction of the tape material 31 in printing both in left alignment and in right alignment. Therefore, a proper print result with good appearance can be obtained. Moreover, the user can select printing in left alignment or printing in right alignment on an arbitrary basis and can print, particularly, a character string of the left-to-right horizontal writing system in right alignment. Therefore, more printing patterns are available and the printing device can have more extensive applications.

Embodiment 4

Embodiment 4 of the present disclosure is described next.

The above-described printing device 103 according to Embodiment 3 receives input of only characters of the left-to-right horizontal writing system. Conversely, the printing device according to Embodiment 4 receives input of a character string in which characters of the right-to-left horizontal writing system and characters of the left-to-right horizontal writing system are mixed. Then, the printing device according to Embodiment 4 prints the input-received character string on the tape material 31 either in left alignment or in right alignment according to the user selection. Details will be described below.

The printing device according to Embodiment 4 has the same appearance and physical configuration as the printing devices 101, 102, and 103 according to Embodiments 1, 2, and 3. Therefore, detailed explanation is omitted here. The printing device according to Embodiment 4 shares the functional configuration with the printing device 103 according to Embodiment 3 shown in FIG. 17. Therefore, the functional configuration of the printing device according to Embodiment 4 will be described with reference to the printing device 103 shown in FIG. 17.

The input receiver 110 receives input of a character string including characters of the second writing system in which writing proceeds from right to left (the right-to-left horizontal writing system). In other words, the input receiver 110 receives input of only characters of the right-to-left horizontal writing system, for example, as shown in FIG. 5B or a character string in which character strings of the right-to-left horizontal writing system and character strings of the left-to-right horizontal writing system are mixed as shown in FIGS. 5C to 5E.

Figure 21A:
FIGS. 21A to 21F are illustrations showing the character string processing for printing a character string including characters of the right-to-left horizontal writing system in left alignment in the printing device comprising a left-to-right horizontal writing printing mechanism according to Embodiment 4.
Figure 21B:

When input of a character string including characters of the right-to-left horizontal writing system is received, the saver 111 saves the characters of the right-to-left horizontal writing system included in the entered character string in the RAM 42 in the order of receiving the input. In other words, when input of a character string including characters of the right-to-left horizontal writing system as shown in FIG. 21A is received, the saver 111 saves the characters of the right-to-left horizontal writing system included in the entered character string in the RAM 42 in the order of receiving the input as shown in FIG. 21B. Then, the saver 111 saves the characters of the left-to-right horizontal writing system included in the entered character string in the RAM 42 in the reverse order to the order of receiving the input as in the case of receiving input of only characters of the left-to-right horizontal writing system.

The selection receiver 123 receives selection as to whether to print the character string of which input is received by the input receiver 110 on the tape material 31 in left alignment or in right alignment. The selection receiver 123 has the same function as described in Embodiment 3.

When the right alignment is selected by the selection receiver 123, the printing device 103 prints the input-received character string including characters of the right-to-left horizontal writing system on the tape material 31 in right alignment. When the right alignment is selected as just described (when the second condition is satisfied), the reader 112, print data creator 113, and print data transmitter 114 execute the same processing as described in Embodiment 1 with reference to FIGS. 7A to 7F, namely the processing executed when the determiner 121 determines that the character string of which input is received by the input receiver 110 includes characters of the right-to-left horizontal writing system.

In other words, when input of a character string including characters of the right-to-left horizontal writing system is received as shown in FIG. 7A, the saver 111 saves the characters of the right-to-left horizontal writing system included in the entered character string in the RAM 42 in the order of receiving the input as shown in FIG. 7B. Then, the saver 111 saves the characters of the left-to-right horizontal writing system included in the entered character string in the RAM 42 in the reverse order to the order of receiving the input as in the case of receiving input of only characters of the left-to-right horizontal writing system. When the right alignment is selected, the reader 112 reads from the RAM 42 one or more characters including characters of the right-to-left horizontal writing system saved in the RAM 42 in the order of being saved in the RAM 42 as shown in FIG. 7C. The print data creator 113 arranges individually horizontally inverted characters of the one or more characters read by the reader 112 in the order of being read to create the inverted print data 82 as shown in FIG. 7D. The print data transmitter 114 sends to the print head 11 the created inverted print data 82 on each line in the order from bottom to top as shown in FIG. 7E. The printer 115 prints with the print head 11 the horizontally inverted characters included in the inverted print data 82 sent to the print head 11 such that the horizontally inverted characters are arranged closer to the leading end in the transfer direction of the tape material 31. In such a case, with the printing being immediately started without advancing the unprinted tape material 31 before printing the first character sent to the print head 11, the one or more characters are printed closer to the leading end in the transfer direction of the tape material 31. As a result, the print result as shown in FIG. 7F is obtained.

On the other hand, when the left alignment is selected by the selection receiver 123, the printing device 103 prints the input-received character string including characters of the right-to-left horizontal writing system on the tape material 31 in left alignment. The processing executed when the left alignment is selected as in this case (when the first condition is satisfied) will be described below with reference to FIGS. 21C to 21F. Here, the processing of the saver 111 when input of a character string including characters of the right-to-left horizontal writing system or characters of the right-to-left horizontal writing system is received is the same processing as in the above-described case of FIG. 7. Therefore, detailed explanation is omitted here.

When the left alignment is selected by the selection receiver 123, the reader 112 reads from the RAM 42 the one or more characters saved in the RAM 42 in the order of characters to position on the left in the character string.

Figure 21C:

For example as shown in FIG. 21A, when input of a character string in which characters of the right-to-left horizontal writing system and characters of the left-to-right horizontal writing system are mixed is received, the order of characters to position on the left in the character string corresponds to the order of receiving the input for characters of the left-to-right horizontal writing system and corresponds to the reverse order to the order of receiving the input for characters of the right-to-left horizontal writing system. In other words, in this case, the order of characters to position on the right in the character string corresponds to the reverse order to the order of being saved in the RAM 42 shown in FIG. 21B. Therefore, when the left alignment is selected, the reader 112 reads from the RAM 42 the one or more characters including characters of the right-to-left horizontal writing system saved in the RAM 42 in the reverse order to the order of being saved in the RAM 42 as shown in FIG. 21C.

When the right alignment is selected by the selection receiver 123, the print data creator 113 arranges the one or more characters read by the reader 112 in the order of being read to create non-inverted print data.

Figure 21D:
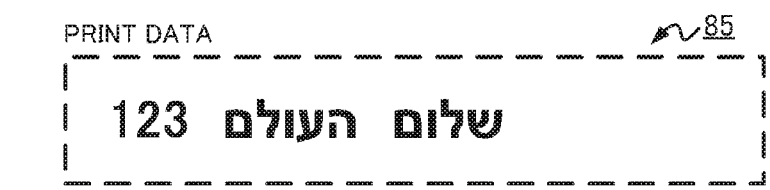

For example as shown in FIG. 21A, when input of a character string including Hebrew characters of the right-to-left horizontal writing system is received, the print data creator 113 develops the characters read from the RAM 42 by the reader 112 into bitmap data. Then, the print data creator 113 reads layout information stored in the ROM 41 and arranges the one or more characters saved in the RAM 42 in the order of being read according to the read layout information to create non-inverted print data 85 as shown in FIG. 21D.

When the non-inverted print data 85 are created by the print data creator 113, the print data transmitter 114 sends the created non-inverted print data 85 to the print head 11.

Figure 21E:
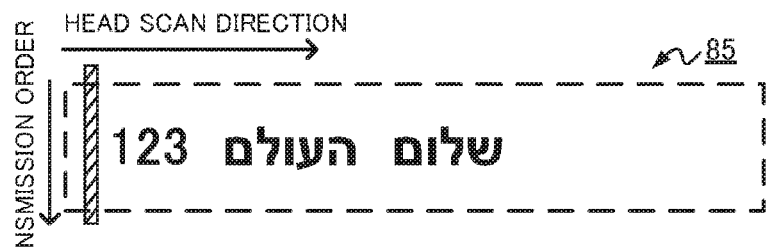

For example as shown in FIG. 21A, when input of a character string including Hebrew characters of the right-to-left horizontal writing system is received, the print data transmitter 114 scans in the head scan direction and sends to the print head 11 the non-inverted print data 85 saved in the layout buffer one line (the shaded area) at a time as shown in FIG. 21E. At this point, the print data transmitter 114 sends to the print head 11 the print data 85 on each line in the order from top to bottom.

The printer 115 prints with the print head 11 the one or more characters included in the non-inverted print data 85 sent to the print head 11 by the print data transmitter 114 such that the one or more characters are arranged closer to the leading end in the transfer direction of the tape material 31. In such a case, with the printing being immediately started without advancing the unprinted tape material 31 before printing the first character sent to the print head 11, the one or more characters are printed closer to the leading end in the transfer direction of the tape material 31. Consequently, the entered character string is arranged in the order of characters to position on the left and printed on the tape material 31 in left alignment.

The process flow of the printing procedure executed by the above-described printing device 103 according to Embodiment 4 will be described with reference to the flowchart shown in FIG. 22.

Figure 22:
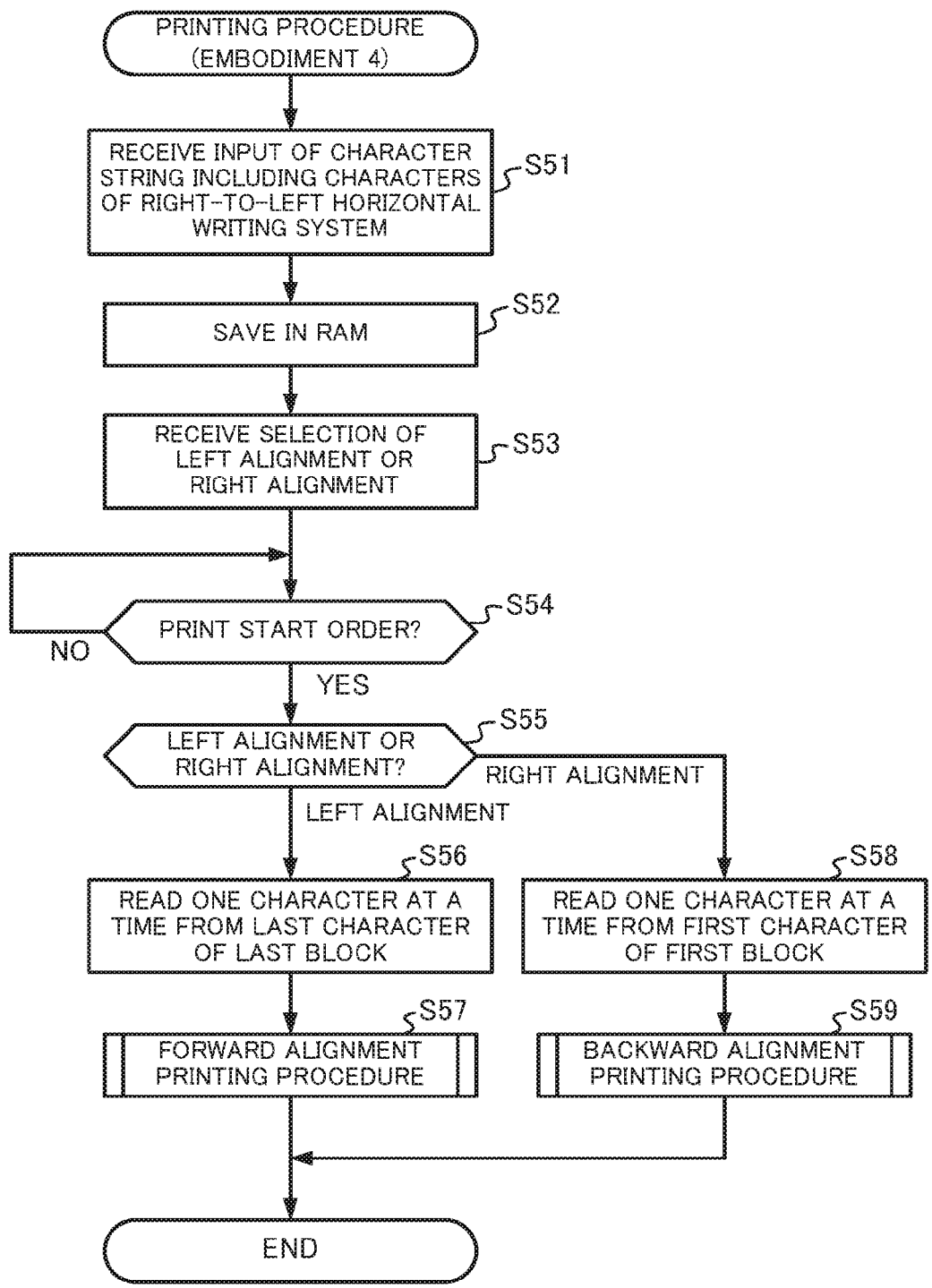
FIG. 22 is a flowchart showing the process flow of the printing procedure executed by the printing device according to Embodiment 4.

The flowchart shown in FIG. 22 starts, for example, when the user powers on the printing device 103 for printing a desired character string on the tape material 31 and the printing device 103 is booted up to the printable state.

As the procedure of the flowchart shown in FIG. 22 starts, the input receiver 110 receives input of a character string including characters of the right-to-left horizontal writing system (Step S51). The saver 111 saves one or more characters included in the input-received character string in the RAM 42 (Step S52).

In more detail, when input of a character string including characters of the right-to-left horizontal writing system is received by the input receiver 110 as shown in FIG. 21A, the saver 111 saves character codes of the characters of the right-to-left horizontal writing system included in the input-received character string in the RAM 42 in the order of receiving the input as shown in FIG. 21B. On the other hand, the saver 111 saves character codes of the characters of the left-to-right horizontal writing system included in the input-received character string in the RAM 42 in the reverse order to the order of receiving the input.

After the input-received character string is saved in the RAM 42, the selection receiver 123 receives selection of left alignment or right alignment (Step S53).

As selection of left alignment or right alignment is received by the selection receiver 123, the reader 112 determines whether a print start order is made (Step S54). Unless a print start order is made (Step S54; NO), the reader 112 waits for a print start order being made.

As a print start order is made (Step S54; YES), the reader 112 determines whether the selection received by the selection receiver 123 is left alignment or right alignment (Step S55). If the left alignment is selected (Step S55; LEFT ALIGNMENT), the reader 112 reads the character codes of the characters one at a time from the last character of the last block (Step S56). In other words, the reader 112 reads from the RAM 42 the one or more characters including characters of the right-to-left horizontal writing system saved in the RAM 42 in the reverse order to the order of being saved in the RAM 42 as shown in FIG. 21C.

Figure 21F:

Then, the printing device 103 executes a forward alignment printing procedure (Step S57). This forward alignment printing procedure is the same procedure as described in Embodiment 1 with reference to the flowchart shown in FIG. 11. In other words, the print data creator 113 develops the read characters into bitmap data one character at a time in the order of being read to create the non-inverted print data 85 as shown in FIG. 21D. Then, the print data transmitter 114 reads and sends to the head the print data 85 on each line in the order from top to bottom as shown in FIG. 21E. The printer 115 executes energization for one line at a time to print the input-received character string including characters of the right-to-left horizontal writing system on the tape material 31 at a position with reference to the left end. Consequently, the print result shown in FIG. 21F is obtained.

On the other hand, if the right alignment is selected in the Step S55 (Step S55; RIGHT ALIGNMENT), the reader 112 reads the character codes of the characters one at a time from the first character of the first block (Step S58). In other words, the reader 112 reads from the RAM 42 the one or more characters including characters of the right-to-left horizontal writing system saved in the RAM 42 in the order of being saved in RAM 42 as shown in FIG. 7C.

Then, the printing device 103 executes a backward alignment printing procedure (Step S59). This backward alignment printing procedure is the same procedure as described in Embodiment 1 with reference to the flowchart shown in FIG. 12. In other words, the print data creator 113 develops the read characters into bitmap data one character at a time in the order of being read and mirror-inverts the bitmap data of each character to create the inverted print data 82 as shown in FIG. 7D. Then, the print data transmitter 114 reads and sends to the head the print data 82 on each line in the order from bottom to top as shown in FIG. 7E. The printer 115 executes energization for one line at a time to print the input-received character string including characters of the right-to-left horizontal writing system on the tape material 31 at a position with reference to the right end. Consequently, the print result shown in FIG. 7F is obtained. Then, the printing procedure shown in FIG. 22 ends As described above, the printing device 103 according to Embodiment 4 receives selection as to whether to print an input-received character string including characters of the right-to-left horizontal writing system on the tape material 31 in left alignment or in right alignment. Then, for printing the character string in right alignment, the printing device 103 according to Embodiment 4 creates horizontally inverted print data and turns the order of sending the print data to the print head 11 upside down. Therefore, it is possible to print characters from the character closer to the reference end with a single printing device 103 having a single print outlet both in printing in left alignment and in printing in right alignment.

As a result, with the printing being immediately started without advancing the unprinted tape material 31 before printing the first character sent to the print head 11, the character string can be printed closer to the leading end in the transfer direction of the tape material 31 in printing both in left alignment and in right alignment. Therefore, a proper print result with good appearance can be obtained. Moreover, the user can select printing in left alignment or printing in right alignment on an arbitrary basis and can print, particularly, a character string of the right-to-left horizontal writing system in left alignment. Therefore, more printing patterns are available and the printing device can have more extensive applications.

Modified Embodiment

Embodiments of the present disclosure are described above. The above-described embodiments are given by way of example and the scope of application of the present disclosure is not limited thereto. In other words, the embodiments of the present disclosure are variously applicable and any modes of embodiments are included in the scope of the present disclosure.

For example, the printing device comprising a left-to-right horizontal writing printing mechanism according to the above-described Embodiments 1 to 4 executes the backward alignment printing procedure for printing a character string on the tape material 31 in right alignment in which the print data creator 113 horizontally inverts the characters read from the RAM 42 to create inverted print data 82 or 84 and the print data transmitter 114 sends to the print head 11 the inverted print data 82 or 84 on each line in the order from bottom to top.

Figure 24:
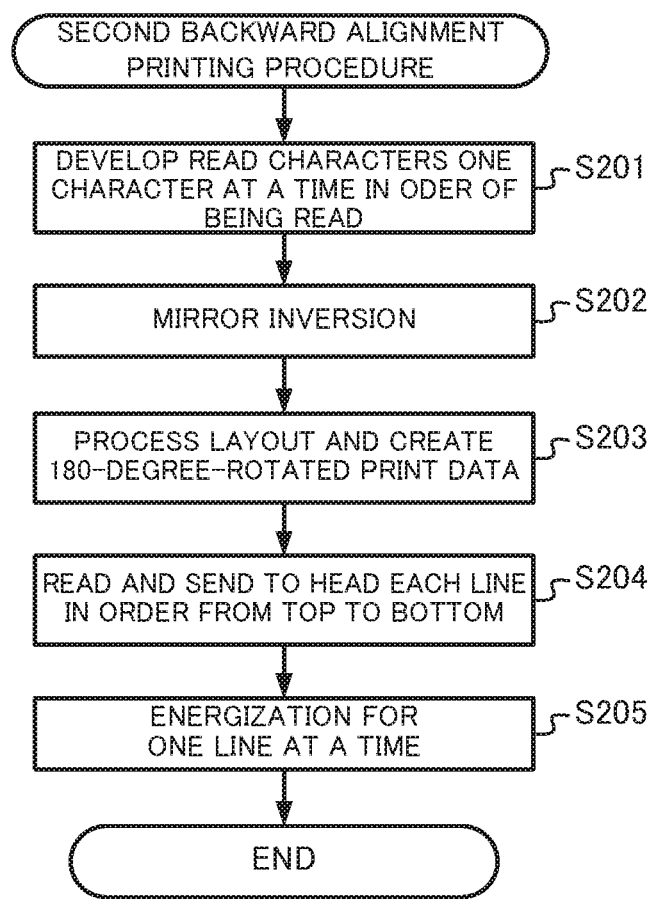
FIG. 24 is a flowchart showing the process flow of the backward alignment printing procedure according to the modified embodiment.

Conversely, a second backward alignment printing procedure as described below may be executed. FIGS. 23A to 23F show the character string processing in a printing device comprising a left-to-right horizontal writing printing mechanism according to a modified embodiment when a character string including characters of the right-to-left horizontal writing system is entered. FIG. 24 is a flowchart showing the process flow of the backward alignment printing procedure according to the modified embodiment. In other words, as shown in FIGS. 23A to 23F and 24, a printing device comprising a left-to-right horizontal writing printing mechanism may execute a second backward alignment printing procedure for printing a character string on the tape material 31 in right alignment in which the print data creator 113 rotates by 180 degrees (inverts) characters read from the RAM 42 to create 180-degree-rotated print data 86 and the print data transmitter 114 sends to the print head 11 the 180-degree-rotated print data 86 on each line in the order from top to bottom.

Compared to rotating the characters by 180 degrees to create 180-degree-rotated print data 86, it is advantageous for the print data creator 113 to horizontally invert the characters read from the RAM 42 to create the inverted print data 82 or 84 because the processing is faster. On the other hand, compared to horizontally inverting the characters to create the print data 82 or 84, the order of the print data transmitter 114 sending to the print head 11 the print data 86 on each line does not need to be switched between the forward alignment printing procedure and the backward alignment printing procedure and the same order can be used when the print data creator 113 rotates the characters read from the RAM 42 by 180 degrees to create the 180-degree-rotated print data 86. Moreover, the characters may be rotated by 180 degrees by horizontally inverting and vertically inverting the characters, rotating the characters by 90 degrees two times, or any other method.

Moreover, for example, the printing device comprising a left-to-right horizontal writing printing mechanism according to the above-described Embodiments 1 to 4 executes the forward alignment printing procedure for printing a character string on the tape material 31 in left alignment in which the print data creator 113 creates the non-inverted print data 81, 83, or 85 without horizontally inverting the characters read from the RAM 42 and the print data transmitter 114 sends to the print head 11 the non-inverted print data 81, 83, or 85 on each line in the order from top to bottom. Moreover, the printing device comprising a left-to-right horizontal writing printing mechanism according to the above-described Embodiments 1 to 4 executes the backward alignment printing procedure for printing a character string on the tape material 31 in right alignment in which the print data creator 113 horizontally inverts the characters read from the RAM 42 to create the inverted print data 82 or 84 and the print data transmitter 114 sends to the print head 11 the inverted print data 82 or 84 on each line on the order from bottom to top.

The above-described printing devices 101, 102, and 103 according to Embodiments 1 to 4 execute the forward alignment printing procedure to create the non-inverted print data 81, 83, or 85 and send to the print head 11 the non-inverted print data 81, 83, or 85 on each line in the order from top to bottom for printing in left alignment (in other word when the first condition is satisfied) and execute the backward alignment printing procedure to create the inverted print data 82 or 84 and send to the print head 11 the inverted print data 82 or 84 on each line in the order from bottom to top for printing in right alignment (in other word when the second condition is satisfied) because they are all described as a printing device comprising a printing mechanism specialized for the left-to-right horizontal writing system. However, the printing device according to the present disclosure may comprise a printing mechanism specialized for the right-to-left horizontal writing system. When comprising a printing mechanism specialized for the right-to-left horizontal writing system, conversely to the one of which the printing mechanism is specialized for the left-to-right horizontal writing system, the printing device executes the backward alignment printing procedure for printing in left alignment (in other words when the first condition is satisfied) and executes the forward alignment printing procedure for printing in right alignment (in other words when the second condition is satisfied).

In more detail, a printing device comprising a printing mechanism specialized for the right-to-left horizontal writing system executes the backward alignment printing procedure for printing a character string on the tape material 31 in left alignment in which the print data creator 113 horizontally inverts the characters read from the RAM 42 to create inverted print data and the print data transmitter 114 sends to the print head 11 the inverted print data on each line in the order from bottom to top. Moreover, such a printing device executes the forward alignment printing procedure for printing a character string on the tape material 31 in right alignment in which the print data creator 113 creates non-inverted print data without horizontally inverting the characters read from the RAM 42 and the print data transmitter 114 sends to the print head 11 the non-inverted print data on each line in the order from top to bottom.

Alternatively, the printing device according to the present disclosure may print a horizontally inverted character string such as on iron patches. In such a case, a horizontally inverted character string is printed. Therefore, when a character string is horizontally inverted to create inverted print data, the print data transmitter 114 sends to the print head 11 the inverted print data on each line in the order from top to bottom. On the other hand, when non-inverted print data are created without horizontally inverting a character string, the print data transmitter 114 sends to the print head 11 the non-inverted print data on each line in the order from bottom to top. In other words, including the above modes to print a horizontally inverted character string, the printing device according to the present disclosure has only to horizontally invert the characters read from the RAM 42 either in the forward alignment printing procedure or in the backward alignment printing procedure and use the opposite orders in the vertical direction of sending the print data to the head in the forward alignment printing procedure and in the backward alignment printing procedure.

Moreover, in the above-described Embodiments 1 to 4, the recording medium on which the printing device 101, 102, or 103 prints a character string is the tape material 31 by way of example. However, the recording medium in the present disclosure is not limited to the tape material 31 or a label-like medium and may be a cut sheet, film, or the like. In other words, it is possible to configure any printing device discharging a recording medium in parallel to the writing direction of a character string as the printing device 101, 102, or 103 according to Embodiments 1 to 4 and apply the above-described printing procedures thereto.

Moreover, in the above-described Embodiments 1 to 4, the printing device 101, 102, or 103 can print a character string on the tape material 31 both in left alignment and in right alignment. However, the printing device according to the present disclosure does not have to be capable of printing a character string both in left alignment and in right alignment as long as the printing device prints a character string closer to the opposite end to the one the printing mechanism is specialized for. In other words, the printing device according to the present disclosure has only to create inverted print data, send to the print head 11 the horizontally inverted characters included in the inverted print data in the upside-down order, and print with the print head 11 the horizontally inverted characters sent in the upside-down order closer to the leading end of the tape material 31 for printing a character string in right alignment with a printing device comprising a printing mechanism specialized for the left-to-right horizontal writing system or for printing a character string in left alignment with a printing device comprising a printing mechanism specialized for the right-to-left horizontal writing system.

Needless to say, it is possible to provide a printing device intrinsically comprising the configuration for realizing the functions according to the present disclosure. Furthermore, it is possible to make an existing information processing device or the like function as the printing device according to the present disclosure by applying programs. In other words, it is possible to make an existing information processing device or the like function as the printing device according to the present disclosure by applying programs for realizing the functional components of the printing device 101 exemplified in the above-described embodiment to the exiting information processing device or the like so that the CPU or the like controlling the existing information processing device or the like can execute the programs.

The above programs can be applied by any method. The programs can be, for example, saved and applied on a non-transitory computer-readable recording medium such as a flexible disc, compact disc (CD)-ROM, digital versatile disk (DVD)-ROM, and memory card. Furthermore, the programs can be superimposed on carrier waves and applied via a communication medium such as the Internet. For example, the programs may be posted and distributed on a bulletin board system (BBS) on a communication network. Then, the programs are activated to run like other application programs under the control of an operating system (OS) to execute the above-described procedures.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A printing device for printing on a recording medium, the printing device comprising:
    a print head configured to print on the recording medium; and
    a processor configured to:
        repeating for each character read in order from a character string, where the character string includes a character of a right-to-left horizontal writing system extending along a first axis, a character of a left-to-right horizontal writing system extending along the first axis, or both:
            acquiring print data corresponding to the read character; and
            horizontally inverting the read character by horizontally inverting the print data corresponding to the read character across a second axis perpendicular to the first axis to create the inverted print data,
        to thereby create inverted print data;
        send to the print head each of the horizontally inverted characters included in the inverted print data in an upside-down order; and
        print with the print head the horizontally inverted characters received by the print head in the upside-down order closer to the leading end in a transfer direction of the recording medium.

2. The printing device according to claim 1, wherein the processor is configured to:
    arrange the one or more characters contained in the character string in the order of being read and thereby create non-inverted print data when a third condition for printing the character string on the recording medium in forward alignment is satisfied, and
    create the inverted print data when the fourth condition for printing the character string on the recording medium in backward alignment is satisfied.

3. A printing device for printing on a recording medium, the printing device comprising:
    a print head configured to print on the recording medium; and
    a processor configured to:
        read from a memory one or more characters contained in a character string saved in the memory;
        arrange individually inverted characters of the one or more characters in the order of being read by the processor and thereby create inverted print data;
        send to the print head each of the inverted characters included in the inverted print data; and
        print with the print head the inverted characters received by the print head closer to the leading end in the transfer direction of the recording medium,
    wherein the processor is configured to:
        read from the memory the one or more characters saved in the memory in the order of characters to position on the left in the character string when a first condition for printing the character string on the recording medium in left alignment is satisfied;

read from the memory the one or more characters saved in the memory in the order of characters to position on the right in the character string when a second condition for printing the character string on the recording medium in right alignment is satisfied;

arrange the one or more characters read by the processor in the order of being read and thereby create non-inverted print data when one of the first condition and second condition is satisfied; and create the inverted print data when the other of the first condition and second condition is satisfied.

4. The printing device according to claim 3, wherein the processor is configured to:

arrange individually inverted characters of the one or more characters in the order of being read by the processor and thereby create inverted print data; and send to the print head each of the inverted characters included in the inverted print data in the upside-down order.

5. The printing device according to claim 4, wherein the processor is configured to:

send to the print head each of the one or more characters included in the non-inverted print data when the non-inverted print data are created by the processor; and send to the print head each of the horizontally inverted characters included in the inverted print data in the upside-down order when the inverted print data are created by the processor.

6. The printing device according to claim 3, wherein the processor is configured to:

send to the print head each of the one or more characters included in the non- inverted print data when the non-inverted print data are created by the processor; and send to the print head each of the inverted characters included in the inverted print data when the inverted print data are created by the processor.

7. The printing device according to claim 6, wherein the processor is configured to:

arrange individually inverted characters of the one or more characters in the order of being read by the processor and thereby create inverted print data, where the one or more characters being rotated by 180 degrees; and send to the print head each of the inverted characters included in the inverted print data in the upside-down order.

8. The printing device according to claim 3, wherein the processor is configured to:

receive input of characters of a first writing system in which writing proceeds from left to right and input of characters of a second writing system in which writing proceeds from right to left; and determine whether the character string of which the input is received includes characters of the second writing system is further provided, wherein the first condition is satisfied when the processor determines that the character string of which the input is received includes no characters of the second writing system, and wherein the second condition is satisfied when the processor determines that the character string of which the input is received includes characters of the second writing system.

9. The printing device according to claim 8, wherein the processor is configured to:

save characters of the first writing system in a memory in the reverse order to the order of receiving the input when input of characters of the first writing system is received by the processor;

save characters of the second writing system in the memory in the order of receiving the input when input of characters of the second writing system is received by the processor;

read the characters of the first writing system saved in the memory in the reverse order to the order of being saved in the memory when the first condition is satisfied; and read the characters of the second writing system saved in the memory in the order of being saved in the memory when the second condition is satisfied.

10. The printing device according to claim 8, wherein the processor is configured to:

save the one or more characters of which the input is received in the memory in the order of receiving the input when the first condition is satisfied;

save characters of the second writing system in the memory in the order of receiving the input when the second condition is satisfied and input of the characters of the second writing system is received by the processor;

save characters of the first writing system in the memory in the reverse order to the order of receiving the input when the second condition is satisfied and input of the characters of the first writing system is received by the processor; and read the one or more characters saved in the memory in the order of being saved in the memory both when the first condition is satisfied and when the second condition is satisfied.

11. The printing device according to claim 3, wherein the processor is configured to:

receive input of characters of a first writing system in which writing proceeds from left to right; and receive specification as to whether to accept input of characters of a second writing system in which writing proceeds from right to left, wherein the first condition is satisfied when specification of not accepting input of characters of the second writing system is received by the processor, and wherein the second condition is satisfied when specification of accepting input of characters of the second writing system is received by the processor.

12. The printing device according to claim 11, wherein the processor is configured to:

save the characters of the first writing system of which the input is received in the memory in the reverse order to the order of receiving the input;

read the characters of the first writing system saved in the memory in the reverse order to the order of being saved in the memory when the first condition is satisfied; and read the characters of the first writing system saved in the memory in the order of being saved in the memory when the second condition is satisfied.

13. The printing device according to claim 12, wherein the processor is configured to:

receive selection as to whether to print the character string of which the input is received on the recording medium in left alignment or in right alignment, wherein the first condition is satisfied when selection of printing the character string on the recording medium in left alignment is received by the processor, and wherein the second condition is satisfied when selection of printing the character string on the recording medium in right alignment is received by the processor.

14. The printing device according to claim 3, wherein the processor is configured to:
   receive input of characters of a first writing system in which writing proceeds from left to right;
   save the characters of the first writing system of which the input is received in the memory in the order of receiving the input;
   read the characters of the first writing system saved in the memory in the order of being saved in the memory when the first condition is satisfied; and
   read the characters of the first writing system saved in the memory in the reverse order to the order of being saved in the memory when the second condition is satisfied.

15. The printing device according to claim 3, wherein the processor is configured to:
   receive input of characters of a second writing system in which writing proceeds from right to left;
   save the characters of the second writing system of which the input is received in the memory in the order of receiving the input;
   read the characters of the second writing system saved in the memory in the reverse order to the order of being saved in the memory when the first condition is satisfied; and
   read the characters of the second writing system saved in the memory in the order of being saved in the memory when the second condition is satisfied.

16. The printing device according to claim 15, wherein the processor is configured to:
   receive selection as to whether to print the character string of which the input is received on the recording medium in left alignment or in right alignment,
   wherein the first condition is satisfied when selection of printing the character string on the recording medium in left alignment is received by the processor, and
   wherein the second condition is satisfied when selection of printing the character string on the recording medium in right alignment is received by the processor.

17. The printing device according to claim 3, wherein the processor is configured to:
   receive input of characters of a second writing system in which writing proceeds from right to left;
   save the characters of the second writing system of which the input is received in the memory in the order of receiving the input;
   read the characters of the second writing system saved in the memory in the reverse order to the order of being saved in the memory when the first condition is satisfied; and
   read the characters of the second writing system saved in the memory in the order of being saved in the memory when the second condition is satisfied.

18. The printing device according to claim 17, wherein the processor is configured to:
   receive selection as to whether to print the character string of which the input is received on the recording medium in left alignment or in right alignment,
   wherein the first condition is satisfied when selection of printing the character string on the recording medium in left alignment is received by the processor, and
   wherein the second condition is satisfied when selection of printing the character string on the recording medium in right alignment is received by the processor.

19. The printing device according to claim 3, wherein the processor is configured to:
   create the non-inverted print data when the first condition is satisfied; and
   create the inverted print data when the second condition is satisfied.

20. The printing device according to claim 3, wherein the processor is configured to:
   create the inverted print data when the first condition is satisfied; and
   create the non-inverted print data when the second condition is satisfied.

21. A printing method executed by a processor of a printing device for printing on a recording medium with a print head, the printing method comprising:
   repeat for each character read in order from a character string, where the character string includes a character of a right-to-left horizontal writing system extending along a first axis, a character of a left-to-right horizontal writing system extending along the first axis, or both:
      acquiring print data corresponding to the read character; and
      horizontally inverting the read character by horizontally inverting the print data corresponding to the read character across a second axis perpendicular to the first axis to create the inverted print data,
   to thereby create inverted print data;
   sending to the print head each of the horizontally inverted characters included in the inverted print data in an upside-down order; and
   printing with the print head the horizontally inverted characters received by the print head in the upside-down order closer to the leading end in a transfer direction of the recording medium.

22. A printing method executed by a processor of a printing device for printing on a recording medium with a print head, the printing method comprising:
   reading from a memory one or more characters contained in a character string saved in the memory;
   arranging individually inverted characters of the one or more characters in the order of being read by the processor and thereby create inverted print data;
   sending to the print head each of the inverted characters included in the inverted print data; and
   printing with the print head the inverted characters received by the print head closer to the leading end in the transfer direction of the recording medium,
   the printing method further comprising:
   reading from the memory the one or more characters saved in the memory in the order of characters to position on the left in the character string when a first condition for printing the character string on the recording medium in left alignment is satisfied;
   reading from the memory the one or more characters saved in the memory in the order of characters to position on the right in the character string when a second condition for printing the character string on the recording medium in right alignment is satisfied;
   arranging the one or more characters read by the processor in the order of being read and thereby create non-inverted print data when one of the first condition and second condition is satisfied; and
   creating the inverted print data when the other of the first condition and second condition is satisfied.

23. A non-transitory nonvolatile computer-readable recording medium storing programs for making a computer control a printing device for printing on a recording medium with a print head, the program making the computer perform processes comprising:
- repeat for each character read in order from a character string, where the character string includes a character of a right-to-left horizontal writing system extending along a first axis, a character of a left-to-right horizontal writing system extending along the first axis, or both:
  - acquiring print data corresponding to the read character; and
  - horizontally inverting the read character by horizontally inverting the print data corresponding to the read character across a second axis perpendicular to the first axis to create the inverted print data,
- to thereby create inverted print data;
- sending to the print head each of the horizontally inverted characters included in the inverted print data in an upside-down order; and
- printing with the print head the horizontally inverted characters received by the print head in the upside-down order closer to the leading end in a transfer direction of the recording medium.

24. A non-transitory nonvolatile computer-readable recording medium storing programs for making a computer control a printing device for printing on a recording medium with a print head, the program making the computer perform processes comprising:
- reading from a memory one or more characters contained in a character string saved in the memory;
- arranging individually inverted characters of the one or more characters in the order of being read by the processor and thereby create inverted print data;
- sending to the print head each of the inverted characters included in the inverted print data; and
- printing with the print head the inverted characters received by the print head closer to the leading end in the transfer direction of the recording medium, wherein the programs further make the computer perform processes comprising:
- reading from the memory the one or more characters saved in the memory in the order of characters to position on the left in the character string when a first condition for printing the character string on the recording medium in left alignment is satisfied;
- reading from the memory the one or more characters saved in the memory in the order of characters to position on the right in the character string when a second condition for printing the character string on the recording medium in right alignment is satisfied;
- arranging the one or more characters read by the processor in the order of being read and thereby create non-inverted print data when one of the first condition and second condition is satisfied; and
- creating the inverted print data when the other of the first condition and second condition is satisfied.

* * * * *